(12) United States Patent
Sanada

(10) Patent No.: US 9,341,926 B2
(45) Date of Patent: May 17, 2016

(54) DRIVE MECHANISM FOR MOVABLE MIRROR OF CAMERA

(71) Applicant: RICOH IMAGING COMPANY, LTD., Tokyo (JP)

(72) Inventor: Shinichiro Sanada, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/320,886

(22) Filed: Jul. 1, 2014

(65) Prior Publication Data

US 2015/0010297 A1 Jan. 8, 2015

(30) Foreign Application Priority Data

Jul. 5, 2013 (JP) ................................ 2013-141780

(51) Int. Cl.
*G03B 19/12* (2006.01)
*G03B 7/0997* (2014.01)

(52) U.S. Cl.
CPC ............ *G03B 19/12* (2013.01); *G03B 7/09971* (2015.01); *G03B 2217/002* (2013.01)

(58) Field of Classification Search
USPC ......................................... 396/354, 356, 358
See application file for complete search history.

(56) References Cited

U.S. PATENT DOCUMENTS

| | | | |
|---|---|---|---|
| 4,536,070 A | 8/1985 | Shono | |
| 4,730,200 A | 3/1988 | Kitazawa | |
| 6,003,999 A | 12/1999 | Kitaoka et al. | |
| 8,753,024 B2 | 6/2014 | Yamada | |
| 8,783,972 B2 | 7/2014 | Yamada | |
| 2011/0052177 A1* | 3/2011 | Yamana et al. | ............... 396/358 |

FOREIGN PATENT DOCUMENTS

| | | |
|---|---|---|
| JP | 05-008595 | 3/1993 |
| JP | 05-038344 | 9/1993 |
| JP | 09-274250 | 10/1997 |

* cited by examiner

*Primary Examiner* — Minh Phan
(74) *Attorney, Agent, or Firm* — Greenblum & Bernstein P.L.C.

(57) ABSTRACT

A movable-mirror drive mechanism of a camera includes a main mirror held by a main-mirror holding frame rotatable between a viewfinder light-guiding position and a retracted position; a sub-mirror held by a sub-mirror holding frame that is rotatably supported by the main-mirror holding frame, wherein the sub-mirror holding frame is positioned in a jutting-out position when the main mirror is in the viewfinder light-guiding position, and the sub-mirror holding frame is retracted with the main mirror when the main mirror is in the retracted position; and a vibration control member which rotates in association with rotation of the main-mirror holding frame and holds the sub-mirror holding frame in the jutting-out position to prevent the sub-mirror holding frame from rotating toward the sub-mirror retracted position when the main mirror rotates to the viewfinder light-guiding position.

15 Claims, 24 Drawing Sheets

DRIVE MECHANISM FOR MOVABLE MIRROR OF CAMERA

BACKGROUND OF THE INVENTION

1. Field of the Invention

The present invention relates to a drive mechanism for driving a movable mirror provided in a camera (e.g., an SLR camera), and in particular to a mechanism, provided in association with the drive mechanism, for suppressing bouncing of the movable mirror.

2. Description of the Related Art

In SLR cameras, a movable mirror (quick-return mirror) is provided, which is capable of moving up and down. More specifically, capable of rotating between a viewfinder light-guiding position (mirror-down position), in which the movable mirror is positioned in a photographing optical path to reflect incident light emanated from an object (object-emanated light) toward a viewfinder optical system, and a retracted position (mirror-up position), in which the movable mirror is retracted from the photographing optical path to allow the object-emanated light to travel toward a shutter. In SLR cameras which determine whether an object is in-focus using a phase-difference AF sensor, the movable mirror is provided with a main mirror and a sub-mirror, which is supported by the main mirror. The sub-mirror, which is provided as a movable mirror, moves in association with the main mirror (which is for leading object light to the viewfinder) and part of the light emanated from an object is reflected toward the AF sensor by the sub-mirror. The sub-mirror is supported to be rotatable relative to the main mirror, and operates to project into the optical path to thereby make it possible to lead the incident light to the AF sensor when the main mirror is in the viewfinder light-guiding position (mirror-down position). When the main mirror is retracted to the retracted position, the sub-mirror also operates and moves out of the optical path.

Upon the movable mirror rotating and bouncing (vibrating) upon impact against a positioning memer, vibrations of the movable mirror can cause image shake and disturb improvement in continuous shooting speed. Accordingly, various mechanisms for suppressing such bouncing of the movable mirror have been proposed. In the related art, bounce suppression of the main mirror has chiefly been taken into consideration; however, if the demand for vibration isolating performance and continuous shooting (photographing) performance becomes high, it is required to suppress not only the bouncing of the main mirror but also the bouncing of the sub-mirror. For instance, if the sub-mirror bounces upon the main mirror rotating to the viewfinder light-guiding position, a distance measuring operation cannot be performed until the sub-mirror comes to a standstill, so that it is required to suppress bouncing of the sub-mirror when the main mirror is in a mirror-down state to improve continuous shooting speed. In addition, if the sub-mirror bounces to thereby cause mechanical shock upon the main mirror rotating to the retracted position, this shock (mirror shock) becomes a cause of camera shake (image shake), so that it is required to suppress the bouncing of the sub-mirror even when the main mirror is in a mirror-up state (retracted state). As a countermeasure for this problem, vibrations of the sub-mirror can be controlled by adjusting the operating speed of the main mirror by the setting of the cam profile of the cam mechanism for controlling rotation of the main mirror. Alternatively, a mechanism which forcibly holds down the operation of the sub-mirror by engaging a groove which is formed in a holding member for the sub-mirror with a projection-like restrictive member which is formed inside the mirror box when the main mirror rotates to the viewfinder light-guiding position has been proposed in Japanese Unexamined Patent Publication No. H09-274250.

In regard to pursuing higher levels of vibration isolating performance and continuous shooting performance, there have been limitations in effectively controlling vibrations of the sub-mirror simply by adjusting the operating speed of the main mirror by the setting of the cam profile of the cam mechanism. Additionally, in the mechanism disclosed in the above-mentioned Japanese Unexamined Patent Publication No. H09-274250, if the operation timing deviates even slightly, the restrictive member becomes incapable of being smoothly inserted into the groove of the sub-mirror holding member, thus extremely rigorous accuracy control is required.

SUMMARY OF THE INVENTION

The present invention has been devised with consideration of the above described problems and provides a movable-mirror drive mechanism of a camera which can reliably control bouncing of the sub-mirror with a simple structure.

According to an aspect of the present invention, a movable-mirror drive mechanism of a camera is provided, including a main mirror which is held by a main-mirror holding frame and is driven to rotate between a viewfinder light-guiding position, in which the main mirror is positioned in a photographing optical path to reflect incident light, emanated from an object, toward a viewfinder optical system of the camera, and a retracted position, in which the main mirror is retracted from the photographing optical path to allow the object-emanated light to travel toward a photographic light-receiving medium; a sub-mirror which is held by a sub-mirror holding frame that is supported by the main-mirror holding frame to be rotatable relative to the main-mirror holding frame, wherein the sub-mirror holding frame is positioned in a jutting-out position and the sub-mirror reflects part of the incident light emanated from the object in a direction different from a direction toward the viewfinder optical system when the main mirror is in the viewfinder light-guiding position, and wherein the sub-mirror holding frame is positioned in a sub-mirror retracted position and the sub-mirror is retracted with the main mirror from the photographing optical path when the main mirror is in the retracted position; and a vibration control member which rotates in association with rotation of the main-mirror holding frame, and holds the sub-mirror holding frame in the jutting-out position to prevent the sub-mirror holding frame from rotating toward the sub-mirror retracted position at least when the main mirror rotates to the viewfinder light-guiding position.

It is desirable for the movable-mirror drive mechanism to include a linkage control rotating member which is rotatable about a shaft that is parallel to a shaft of the vibration control member, wherein the linkage control rotating member rotates the sub-mirror holding frame between the jutting-out position and the sub-mirror retracted position by rotating in association with the rotation of the main-mirror holding frame. The linkage control rotating member includes a contactable portion and the vibration control member includes a contactable portion, the contactable portions lying in a plane in which the linkage control rotating member and the vibration control member rotate. When the main-mirror holding frame rotates from the retracted position to the viewfinder light-guiding position, the vibration control member rotates in a direction to make the contactable portion of the linkage control rotating member approach the contactable portion of the vibration control member in order to limit, by engagement between the contactable portion of the linkage control rotating member and the contactable portion of the vibration control member, rotation of the linkage control rotating member in a direction to make the sub-mirror holding frame rotate toward the sub-mirror retracted position.

It is desirable for the linkage control rotating member to include a second contactable portion and for the vibration control member to include a second contactable portion, the second contactable portions lying in the plane in which the linkage control rotating member and the vibration control member rotate. When the main-mirror holding frame rotates from the viewfinder light-guiding position to the retracted position, the vibration control member rotates in a direction to make the second contactable portion of the vibration control member approach the second contactable portion of the linkage control rotating member to limit, by engagement between the second contactable portion of the vibration control member and the second contactable portion of the linkage control rotating member, rotation of the linkage control rotating member in a direction to make the sub-mirror holding frame rotate toward the jutting-out position.

At a midpoint of rotation of the main mirror between the retracted position and the viewfinder light-guiding position, it is desirable for the linkage control rotating member to rotate in a direction to approach the contactable portion of the vibration control member and subsequently rotate in a reverse direction away from the contactable portion of the vibration control member. The contactable portion of the vibration control member includes a cam surface which gives the linkage control rotating member a component of force in a direction to press the linkage control rotating member in the reverse direction when the contactable portion of the linkage control rotating member comes into contact with the contactable portion of the vibration control member before the linkage control rotating member rotates in the reverse direction. This configuration makes it possible to prevent the vibration control member from interfering with the mirror-up operation and the mirror-down operation.

It is desirable for the linkage control rotating member to include an elongated hole, into which a projection that is formed on the sub-mirror holding frame is inserted to be movable within the elongated hole. Moving the projection in and along the elongated hole causes the sub-mirror holding frame to rotate between the jutting-out position and the sub-mirror retracted position.

It is desirable for the sub-mirror holding member to include a contactable portion and the vibration control member to include a contactable portion, the contactable portions lying in a plane in which the sub-mirror holding member and the vibration control member rotate. When the main-mirror holding frame rotates from the retracted position to the viewfinder light-guiding position, the vibration control member rotates in a direction to make the contactable portion of the vibration control member approach the contactable portion of the sub-mirror holding member to limit, by engagement between the contactable portion of the vibration control member and the contactable portion of the sub-mirror holding member, rotation of the sub-mirror holding member toward the sub-mirror retracted position.

It is desirable for the main-mirror holding frame to include a gear and for the vibration control member to include a gear, wherein the gears are engaged with each other so that a rotational force of the main-mirror holding frame is transmitted to the vibration control member via the gears.

It is desirable for the gears to have a gear ratio such that the vibration control member rotates by a greater amount than that of the main-mirror holding frame.

In another embodiment, a movable-mirror drive mechanism of a camera is provided, including a main mirror which is held by a main-mirror holding frame and is driven to rotate between a viewfinder light-guiding position, in which the main mirror is positioned in a photographing optical path to reflect incident light, emanated from an object, toward a viewfinder optical system of the camera, and a retracted position, in which the main mirror is retracted from the photographing optical path to allow the object-emanated light to travel toward a photographic light-receiving medium; a sub-mirror which is held by a sub-mirror holding frame that is supported by the main-mirror holding frame to be rotatable relative to the main-mirror holding frame, wherein the sub-mirror holding frame is positioned in a jutting-out position and the sub-mirror reflects part of the incident light emanated from the object in a direction different from a direction toward the viewfinder optical system when the main mirror is in the viewfinder light-guiding position, and wherein the sub-mirror holding frame is positioned in a sub-mirror retracted position and the sub-mirror is retracted with the main mirror from the photographing optical path when the main mirror is in the retracted position; and a vibration control member which operates in association with rotation of the main-mirror holding frame, suppresses bouncing of the sub-mirror holding frame when the sub-mirror is positioned in at least one of the jutting-out position and the sub-mirror retracted position, and provides the sub-mirror holding frame with a pressing force in a direction corresponding to a rotation direction of the main-mirror holding frame when the vibration control member receives a reaction force from the sub-mirror holding frame in a state where the main mirror is at a midpoint between the retracted position and the viewfinder light-guiding position.

According to the movable-mirror drive mechanism, the bouncing of the sub-mirror can be suppressed with a simple configuration in which the drive mechanism is provided with the vibration control member that rotates in association with the main mirror. Since the vibration control member moves to a position to suppress the bouncing of the sub-mirror by rotating in association with rotation of the main mirror, tolerance for deviation of the operational timing is greater than that of vibration control mechanism in which the sub-mirror holding frame itself is engaged with a fixed member, and the bouncing of the sub-mirror can be reliably suppressed even though the movable-mirror drive mechanism is simple in structure. In addition, when the vibration control member comes into contact with the sub-mirror holding frame and thereupon receives a reaction force in a state where the main mirror is at a midpoint between the viewfinder light-guiding position and the retracted position, the main mirror and the sub-mirror can be made to move in association with each other with reliability by the vibration control member exerting a pressing force on the sub-mirror holding frame.

The present disclosure relates to subject matter contained in Japanese Patent Application No. 2013-141780 (filed on Jul. 5, 2013) which is expressly incorporated herein by reference in its entirety.

BRIEF DESCRIPTION OF THE DRAWINGS

The present invention will be described below in detail with reference to the accompanying drawings in which.

DESCRIPTION OF THE EMBODIMENTS

Figure 1:
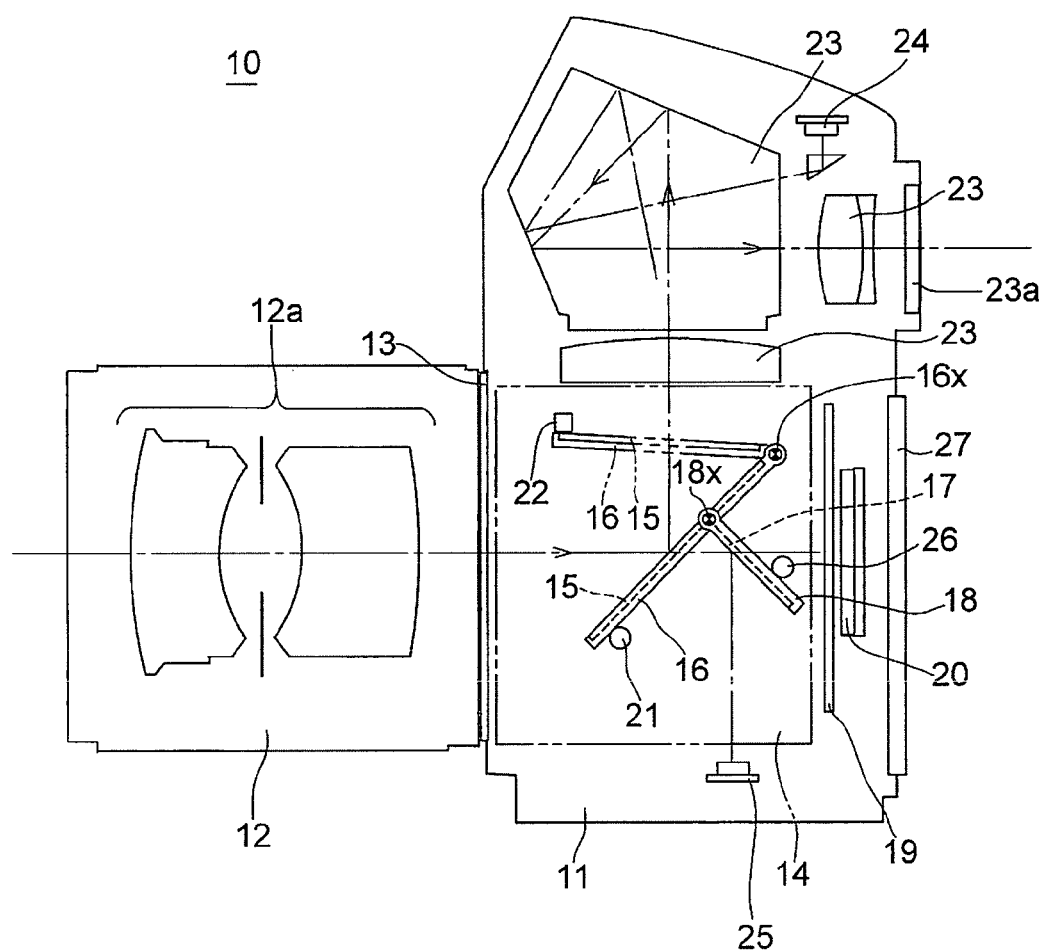
FIG. 1 is a diagram showing a schematic representation of the optical system of an SLR camera according to the present invention.

An SLR camera (hereinafter referred simply to as camera) 10 shown in FIG. 1 is provided on the front of a camera body 11 with a lens mount 13, to which an interchangeable lens 12 is detachably attached. The camera body 11 is provided therein behind the lens mount 13 with a mirror box 14.

The camera body 11 is provided, inside the mirror box 14, with a main mirror 15 and a sub-mirror 17 which constitute a movable mirror (quick-return mirror). The main mirror 15 is fixedly supported on a main mirror seat (main-mirror holding frame) 16, and the main mirror seat 16 is installed between both side walls of the mirror box 14 and is pivoted about a pair of main-mirror support shafts 16x coaxial with each other which are respectively fixed to these side walls. The movable mirror is provided, on the main mirror seat 16, with a sub-mirror seat (sub-mirror holding frame) 18 which is pivoted on the main mirror seat 16 about a pair of sub-mirror support shafts 18x coaxial with each other and substantially parallel to the pair of main-mirror support shafts 16x. The sub-mirror 17 is fixedly supported on the sub-mirror seat 18. In the following descriptions, the main mirror seat 16 and the sub-mirror seat 18 are regarded as members that respectively support the main mirror 15 and the sub-mirror 17, unless otherwise noted.

The camera body 11 is provided therein, behind the mirror box 14, with a focal plane shutter (hereinafter referred to as simply a shutter) 19, and is provided behind the shutter 19 with an image sensor 20. The present embodiment of the camera 10 is a digital camera using the image sensor 20 as a photographic light-receiving medium; however, the present invention can also be applied to a camera using silver-salt film as a photographic light-receiving medium.

The main mirror 15 (the main mirror seat 16) reciprocatively rotates (swings) about the pair of main-mirror support shafts 16x between a mirror-down position (viewfinder light-guiding position; shown by solid lines in FIG. 1 and also shown in FIGS. 3 through 5), in which the main mirror 15 is positioned in a photographing optical path (which extends from a photographing lens system 12a provided in the interchangeable lens 12 to the image sensor 20) to be inclined at an angle of approximately 45 degrees with respect to the photographing optical path, and a mirror-up position (retracted position; shown by two-dot chain lines in FIG. 1 and also shown in FIG. 10), in which the main mirror 15 is retracted upward from the photographing optical path. A mirror-down position defining pin 21 projects inside the mirror box 14 from an inner surface of one of the side walls of the mirror box 14 that are positioned on lateral sides of the main mirror 15, and the mirror-down position of the main mirror 15 is defined by engagement of the mirror-down position defining pin 21 with a stopper 16a formed on a side of the main mirror seat 16. The stopper 16a is formed on a front bridging portion 16f (which will be discussed in detail later) of the main mirror seat 16 and projects laterally from a side of the front bridging portion 16f. The mirror-down position defining pin 21 is formed as an eccentric pin which can be rotated to adjust the position thereof. Specifically, the mirror-down position defining pin 21 is provided with a rotational operating portion 21a (see FIG. 3) which is exposed on a side surface of the mirror box 14, and the contacting relationship between the mirror-down position defining pin 21 and the stopper 16a can be changed by manipulating the rotational operating portion 21a so that the angular position of the mirror-down position defining pin 21 changes, which makes it possible to make adjustments to the angle of the main mirror 15 when the main mirror 15 is in the mirror-down position. In addition, a cushion 22 with which the stopper 16a of the main mirror seat 16 comes into contact when the main mirror 15 is rotated to the mirror-up position is installed in the mirror box 14. Additionally, the camera body 11 is provided therein above the mirror box 14 with a viewfinder optical system 23 that is configured of a pentagonal prism, an eyepiece lens and other optical elements.

Figure 2:
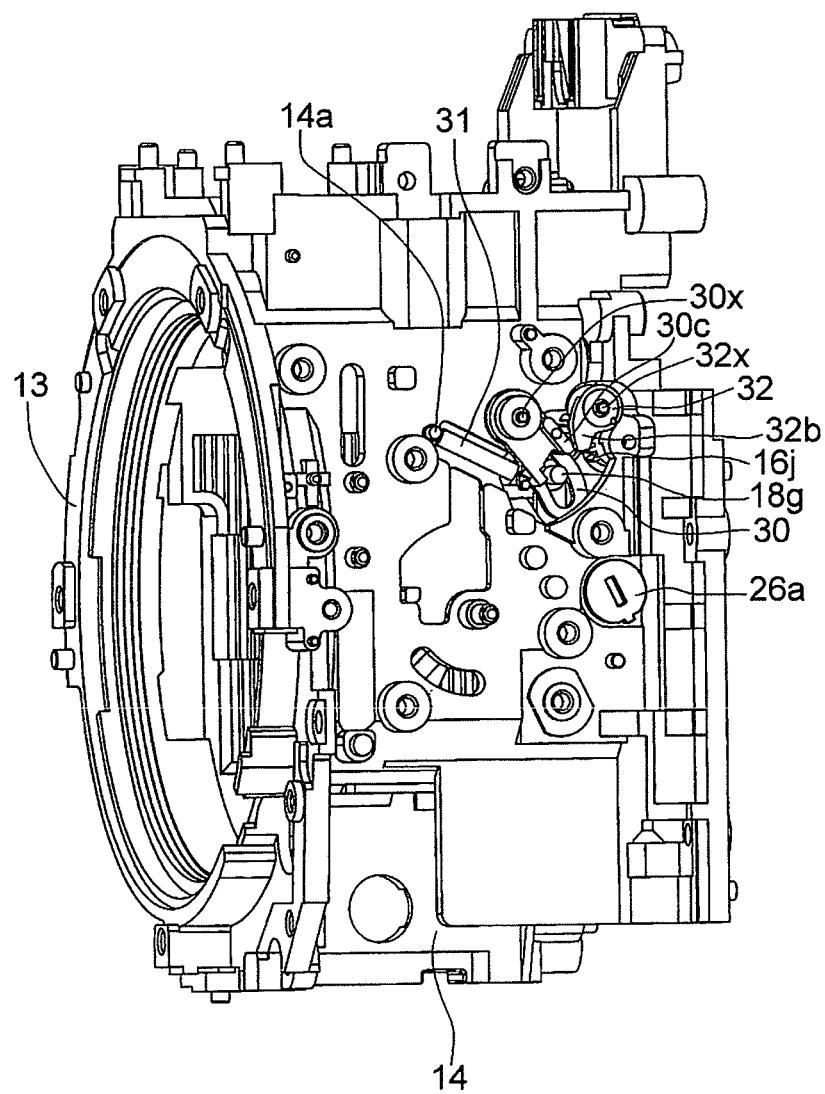
FIG. 2 is a perspective view of a mirror box unit of the SLR camera which incorporates an embodiment of a mirror drive mechanism according to the present invention.

Object-emanated light which enters the mirror box 14 through the photographing lens system 12a in the interchangeable lens 12, with the interchangeable lens 12 mounted to the lens mount 13, is reflected by the main mirror 15 to be incident on the viewfinder optical system 23 and is observable through a viewfinder window 23a formed in the back of the camera body 11. In this state, a photometering operation using a photometering unit 24 which is installed behind the pentagonal prism of the viewfinder optical system 23 can be carried out. In addition, when the main mirror 15 is in the mirror-down position, the sub-mirror 17 (the sub-mirror seat 18) projects obliquely downwards with respect to the main mirror 15 from the underside of the main mirror seat 16 to reflect part of the object-emanated light which is passed through the main mirror 15 (that is made as a half-silvered mirror (pellicle mirror)) downward to be incident on a distance measuring unit 25 installed in a lower part the mirror box 14, which makes it possible to detect an object distance (to detect an in-focus state). The distance measuring unit 25 is an AF sensor unit incorporating a phase-difference AF sensor. The position of the sub-mirror 17 (the sub-mirror seat 18) in which the sub-mirror 17 reflects the incident light toward the distance measuring unit 25 as shown by solid lines in FIG. 1 will be hereinafter referred to as the jutting-out position (see FIGS. 3 through 5). The jutting-out position of the sub-mirror 17 is defined by the engagement of a stopper 18a, which is provided on a side of the sub-mirror seat 18, with a position defining pin 26 which is provided on an inner surface of the mirror box 14. The position defining pin 26 is formed as an eccentric pin which can be rotated to adjust the position thereof. Specifically, the position defining pin 26 is provided with a rotational operating portion 26a (see FIGS. 2 and 3) which is exposed on a side surface of the mirror box 14, and the contacting relationship between the position defining pin 26 and the stopper 18a can be changed by manipulating the rotational operating portion 26a so that the angular position of the position defining pin 26 changes, which makes it possible to make adjustments to the angle of the sub-mirror 17 when the sub-mirror 17 is in the jutting-out position.

On the other hand, when the main mirror 15 is in the mirror-up position, the object-emanated light which enters the mirror box 14 through the photographing lens system 12a travels toward the shutter 19 without being reflected by the main mirror 15, thus being capable of being made incident on the light receiving surface of the image sensor 20 by opening the shutter 19. When the main mirror 15 is in the mirror-up position, the sub-mirror 17 is retracted at the underside of the main mirror seat 16, thus not jutting out into the optical path. This position of the sub-mirror 17 (the sub-mirror seat 18) will be hereinafter referred to as the retracted position (sub-mirror retracted position) (see FIG. 10).

Electronic object images obtained via the image sensor 20 and various other information can be displayed on an LCD monitor 27 provided on the back of the camera body 11.

Figure 3:
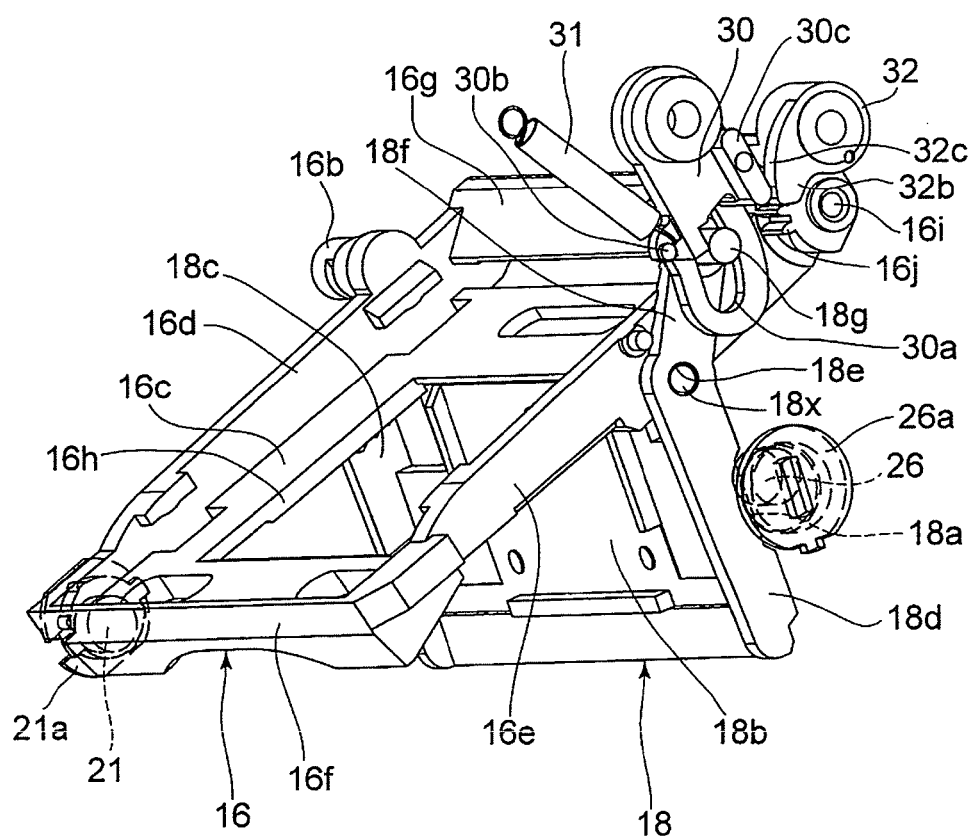
FIG. 3 is a perspective view of the mirror drive mechanism in a mirror-down state.
Figure 4:
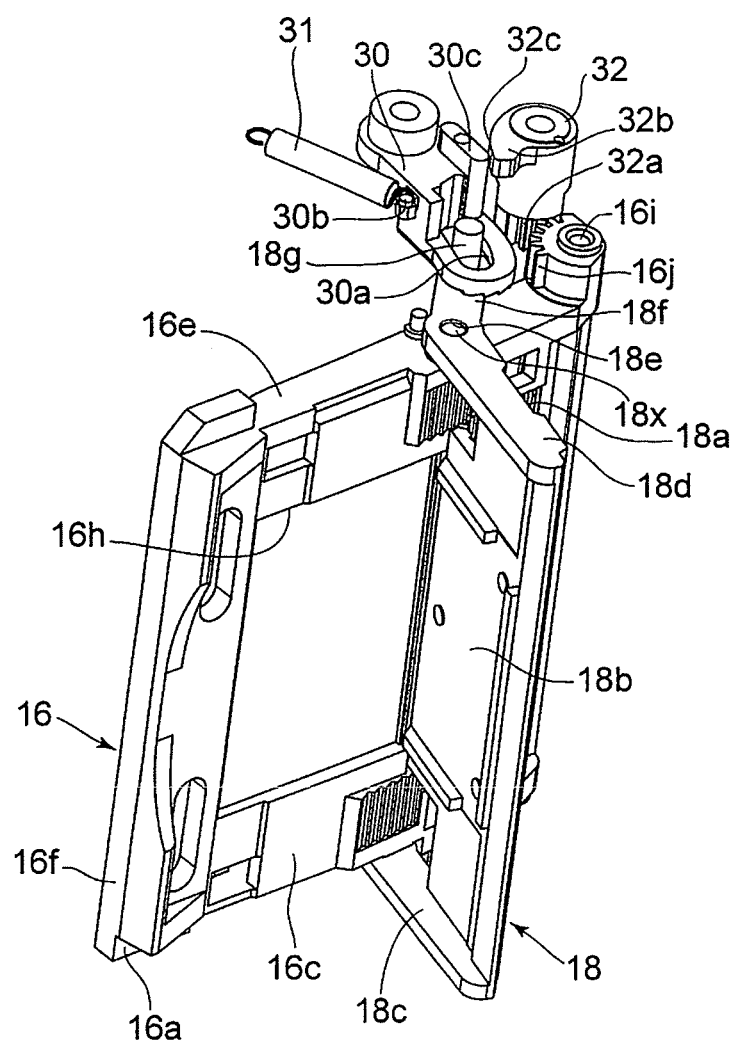
FIG. 4 is a perspective view of the mirror drive mechanism in the mirror-down state, viewed from a different angle.

The structure, provided in the camera body 11, which supports the main mirror 15 and the sub-mirror 17 will be discussed in detail hereinafter. As shown in FIGS. 3 and 4, the main mirror seat 16 is provided with a mirror support base (surface) 16c which supports the main mirror 15 thereon and is provided on the lateral ends of the mirror support base 16c with a pair of side walls 16d and 16e, respectively, and the main mirror seat 16 has the shape of a rectangular frame which is formed by connecting the front ends of the pair of side walls 16d and 16e via the aforementioned front bridging portion 16f and connecting the rear ends of the pair of side walls 16d and 16e via a rear bridging portion 16g of the main mirror seat 16. Both ends (both lateral ends) of the front bridging portion 16f project outwards beyond the positions of the side walls 16d and 16e, respectively, in the lateral direction, and the stopper 16a is formed as the end of the front bridging portion 16f which projects from the side wall 16d. A mirror seat boss 16b projects laterally from a portion of the side wall 16d near the rear bridging portion 16g. A rectangular light transmission aperture 16h which allows part of the object-emanated light to travel toward the sub-mirror 17 is formed in the mirror support base 16c. The rear bridging portion 16g is provided at both ends (both lateral ends) thereof with a pair of shaft holes 16i, respectively, into which the pair of main-mirror support shafts 16x, which are formed on the aforementioned side walls of the mirror box 14 to project toward each other, are inserted. In addition, the aforementioned pair of sub-mirror support shafts 18x are projected laterally in the opposite directions away from each other from the side walls 16d and 16e of the main mirror seat 16, respectively, to be coaxially aligned, and the axis of the pair of sub-mirror support shafts 18x is parallel to the pair of main-mirror support shafts 16x. Although the sub-mirror support shaft 18x on the side wall 16e side is shown in FIGS. 3 and 4 whereas the sub-mirror support shaft 18x on the side wall 16d side is not shown in FIGS. 3 and 4, the sub-mirror support shaft 18x is also formed on the side wall 16d to project therefrom to be coaxial with the sub-mirror support shaft 18x on the side wall 16e side.

The sub-mirror seat 18 is provided with a mirror support base 18b which supports the sub-mirror 17 thereon and is provided on both lateral ends of the mirror support base 18b with a pair of side walls 18c and 18d. The side walls 18c and 18d of the sub-mirror seat 18 are positioned so as to sandwich the pair of side walls 16d and 16e of the main mirror seat 16 therebetween, and a pair of shaft holes 18e into which the pair of sub-mirror support shafts 18x are inserted are formed in the side walls 18c and 18d of the sub-mirror seat 18, respectively. Although one of the pair of shaft holes 18e in the side wall 18d (i.e., the left shaft hole 18e) is shown in FIGS. 3 and 4 whereas the other shaft hole 18e in the side wall 18c (the right shaft hole 18e) is not shown in FIGS. 3 and 4, the shaft hole 18e (the right shaft hole 18e) is also formed in the side wall 18c so that the pair of sub-mirror support shafts 18x are inserted into the pair of shaft holes 18e, respectively. The sub-mirror seat 18 is further provided, on the opposite side of the left shaft hole 18e from the side wall 18d, with an extension arm 18f which extends in a direction different from the direction of extension of the side wall 18d, and the sub-mirror seat 18 is further provided with a linkage pin (projection) 18g which projects laterally (leftwards) from the extension arm 18f.

The sub-mirror seat 18 is linked with the main mirror seat 16 via a linkage control lever (linkage control rotating member) 30. As shown in FIGS. 2 and 5 through 15, the linkage control lever 30 is supported by a side of the mirror box 14 to be rotatable about a linkage lever support shaft 30x provided on the side of the mirror box 14; the axis of the linkage lever support shaft 30x is parallel to the pair of main-mirror support shafts 16x and the pair of sub-mirror support shafts 18x. A linkage hole (elongated hole) 30a which is elongated in a radial direction of the linkage lever support shaft 30x is formed in the linkage control lever 30, and the linkage pin 18g of the sub-mirror seat 18 is inserted into the linkage hole 30a to be movable therein. The linkage hole 30a is provided with a linkage pin sliding surface 30a-1 and a facing surface 30a-2 which face each other in the rotation direction of the linkage control lever 30, and is provided with an inner-diameter-side end surface 30a-3 which constitutes the end of the linkage hole 30a on the side closer to the linkage lever support shaft 30x and an outer-diameter-side end surface 30a-4 which constitutes the end of the linkage hole 30a on the side farther from the linkage lever support shaft 30x. The camera body 11 is provided with a linkage-control-lever biasing spring 31, one end and the other end of which are hooked onto a spring hook 30b of the linkage control lever 30 and a spring hook 14a of the mirror box 14, respectively. The linkage-control-lever biasing spring 31 is an extension coil spring and biases and rotates the linkage control lever 30 clockwise with respect to FIGS. 5 through 15. The biasing force of the linkage-control-lever biasing spring 31 acts on the linkage control lever 30 in a direction to press the linkage pin 18g via the linkage pin sliding surface 30a-1. In addition, the linkage control lever 30 is provided thereon with an arm contacting portion (contactable portion) 30c which projects laterally in a direction parallel to the linkage lever support shaft 30x. The arm contacting portion 30c has a narrow shape elongated in a radial direction of rotation of the linkage control lever 30, and both ends of the arm contacting portion 30c in this radial direction (i.e., the radially outer end and the radially inner end of the arm contacting portion 30c) are each formed to have a semi-circular arc surface. The linkage control lever 30 can control the angle of the sub-mirror seat 18 relative to the main mirror seat 16 via the linkage hole 30a and the linkage pin 18g; operations for this control will be discussed later.

The camera body 11 is provided, on a side (left side as viewed from front) of the mirror box 14, with a mirror drive system which makes the main mirror 15 rotate up and down. This mirror drive system is not shown in the drawings and the detailed description thereof will be omitted from the following descriptions; however, a known mechanism (disclosed in, e.g., Japanese Unexamined Patent Publication No. 2010-266617) can be used. In an example of a specific structure of this mirror drive system, the mirror drive system is provided with a mirror drive lever which is pivoted on the mirror box 14 about a support shaft which is parallel to the pair of main-mirror support shafts 16x, and the mirror drive lever is driven to rotate (swing) by a driving force of a motor. The mirror drive lever can transmit a force to the mirror seat boss 16b, which is formed on a side of the mirror seat 16. Pressing the mirror seat boss 16b downward by the mirror drive lever causes the main mirror 15 to rotate downward toward the mirror-down position, and pressing the mirror seat boss 16b upward by the mirror drive lever causes the main mirror 15 to rotate upward toward the mirror-up position.

The camera body 11 is provided on the other side of the mirror box 14 (the right side of the mirror box 14 as viewed from the front of the camera) with a bounce suppressing mechanism which reduces bouncing (vibration) of the movable mirror 15 to achieve an improvement in vibration isolating performance and continuous shooting performance. The structure of this bounce suppressing mechanism will be discussed hereinafter. As shown in FIGS. 3 through 15, the main mirror seat 16 is provided with a transmission gear 16j having the shape of a sector which is formed circumferentially over a predetermined range about the axis of the pair of shaft holes 16i. As shown in FIGS. 2 through 15, the mirror drive mechanism is provided with a vibration control lever (control member) 32 which has a driven gear 32a engaged with the transmission gear 16j. The vibration control lever 32 is supported on a side of the mirror box 14 to be rotatable about a vibration control lever support shaft 32x provided on the side of the mirror box 14. The axis of the vibration control lever 32, about which the vibration control lever 32 rotates, is parallel to the axes of the pair of main mirror support shafts 16x, the pair of sub-mirror support shafts 18x and the linkage lever support shaft 30x. When the main mirror seat 16 rotates, this rotational force is transmitted from the transmission gear 16j to the driven gear 32a, thus causing the vibration control lever 32 to rotate along a plane parallel to a plane in which the main mirror seat 16 rotates and a plane in which the linkage control lever 30 rotates. The position of the vibration control lever 32 when the main mirror seat 16 is in the mirror-down position and the position of the vibration control lever 32 when the main mirror seat 16 is in the mirror-up position will be hereinafter referred to as the first position and the second position, respectively. The gear ratio of the transmission gear 16j and the driven gear 32a is set to make the amount of rotation (angle of rotation) of the vibration control lever 32 approximately one and a half times greater than the amount of rotation (angle of rotation) of the main mirror seat 16.

The vibration control lever 32 is provided with a vibration control arm (contactable portion) 32b which extends radially outwards. The vibration control arm 32b lies in a plane in which the arm contacting portion 30c of the linkage control lever 30 rotates, and the rotation of the vibration control lever 32 from the second position to the first position is a rotation in a direction to bring a contact cam surface 32c which is formed on the outer periphery of the vibration control arm 32b to approach the arm contacting portion 30c. The contact cam surface 32c is formed into a curved convex surface.

Figure 5:
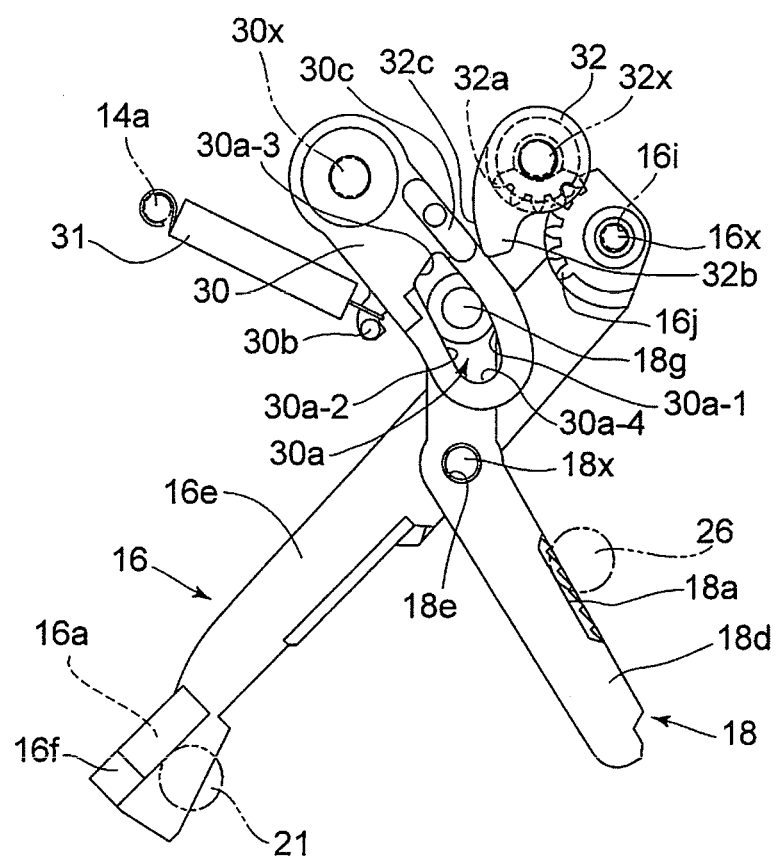
FIG. 5 is a side elevational view of the mirror drive mechanism in the mirror-down state.

Operations of the mirror drive mechanism that has the above described structure will be discussed hereinafter. The rotation direction of each rotatable member which will be discussed below is defined as viewed from the left side of the mirror drive mechanism that is shown in FIGS. 5 through 15. FIG. 5 shows a state where the main mirror 15 is in the mirror-down position. In this state, the main mirror 15 is prevented from rotating downward beyond the mirror-down position by engagement of the stopper 16a with the mirror-down position defining pin 21. The linkage control lever 30 is biased to rotate clockwise with respect to FIGS. 5 through 15 by the linkage-control-lever biasing spring 31. The biasing force of the linkage-control-lever biasing spring 31 causes the linkage pin sliding surface 30a-1 of the linkage hole 30a to press the linkage pin 18g, thus causing the sub-mirror seat 18 to be held in the jutting-out position, in which the stopper 18a is made to contact the position defining pin 26. The vibration control lever 32, which is rotated in association with the main mirror seat 16, is held in the first position, in which the contact cam surface 32c of the vibration control arm 32b is positioned near the arm contacting portion 30c. When the vibration control lever 32 is held in the first position, a slight clearance is provided between the contact cam surface 32c and the arm contacting portion 30c. This clearance prevents the linkage control lever 30 and the vibration control lever 32 from interfering with each other when the angle of the main mirror seat 16 is adjusted by changing the rotation position of the mirror-down position defining pin 21 and when the angle of the sub-mirror seat 18 is adjusted by changing the rotation position of the position defining pin 26.

Figure 6:
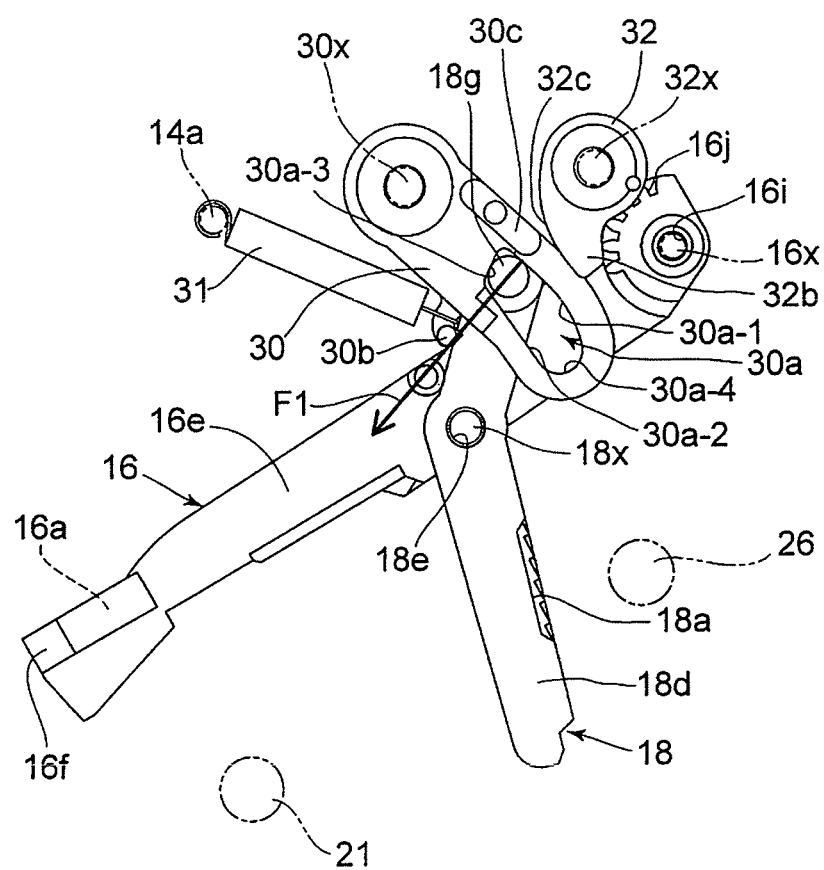
FIG. 6 is a side elevational view of the mirror drive mechanism during the process of moving from the mirror-down state to the mirror-up state.
Figure 8:
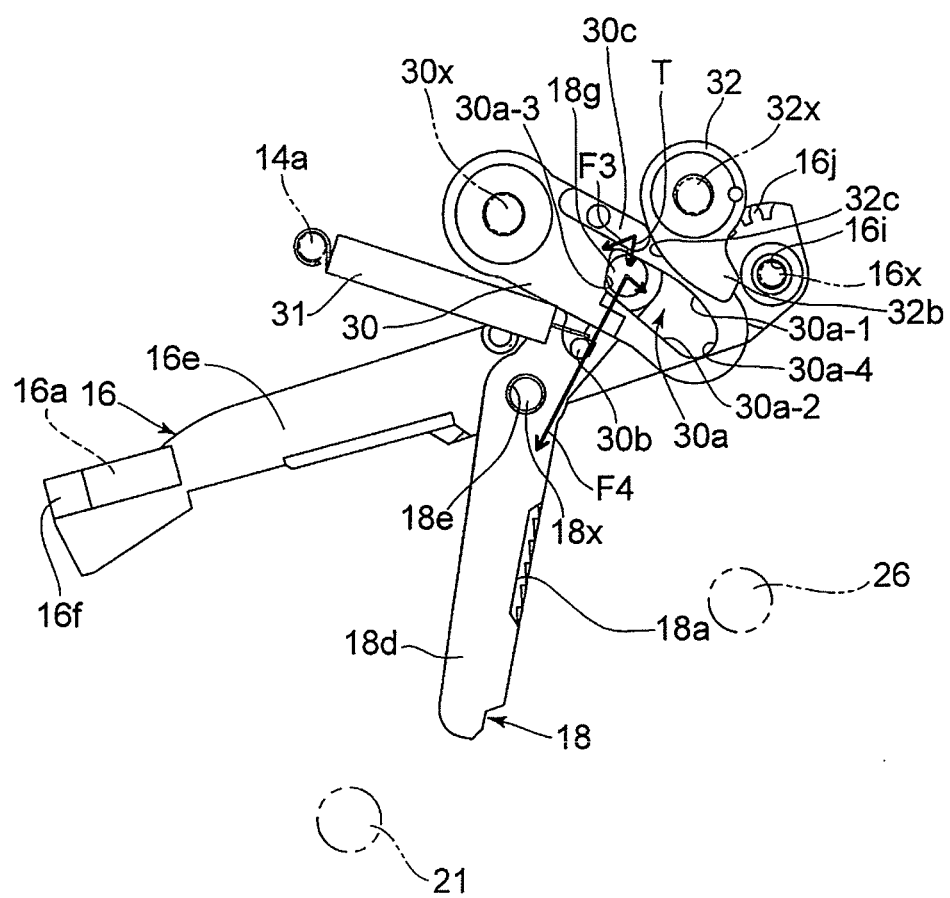
FIG. 8 is a side elevational view of the mirror drive mechanism in the case where the timing at which the linkage control lever rotates in reverse delays from the timing shown in FIG. 7 due to some reasons.
Figure 9:
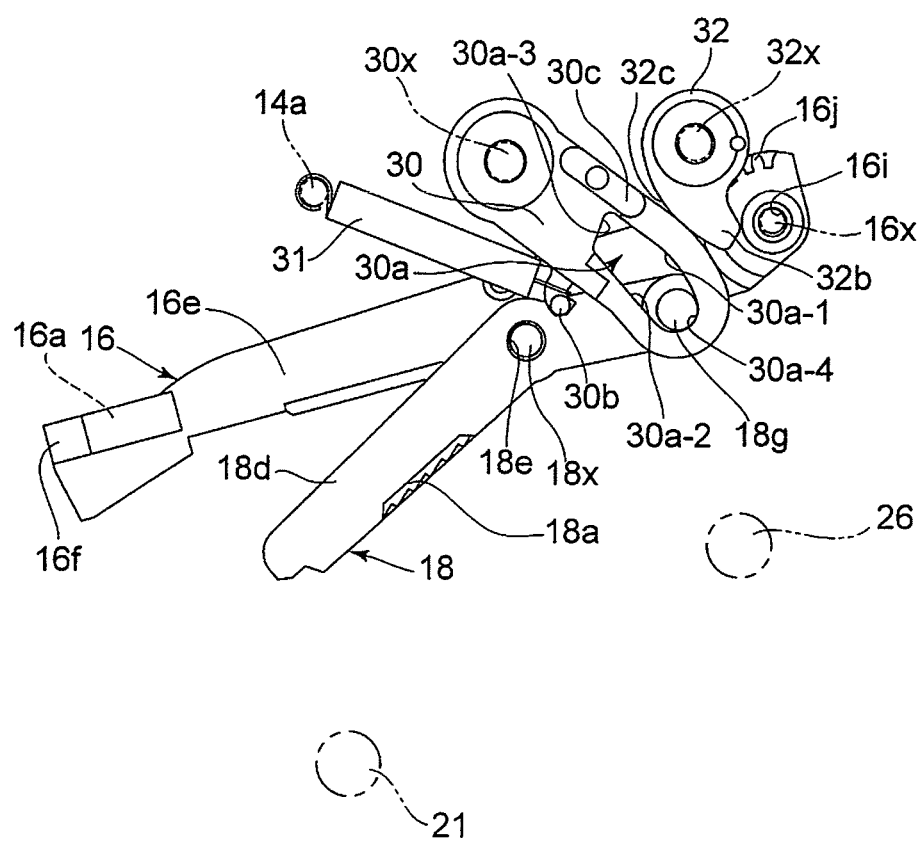
FIG. 9 is a side elevational view of the mirror drive mechanism in a state after the linkage control lever rotates in reverse during the process of moving from the mirror-down state to the mirror-up state.
Figure 10:
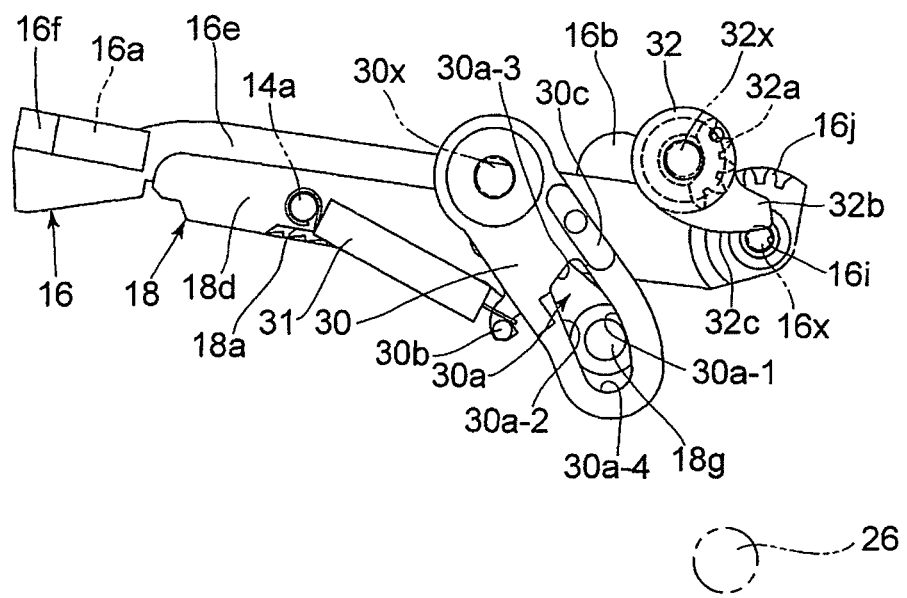
FIG. 10 is a side elevational view of the mirror drive mechanism in the mirror-up state.

FIGS. 6 through 9 show operations of the bounce suppressing mechanism, which operates in association with the mirror drive mechanism, when the main mirror seat 16 that supports the main mirror 15 rotates from the mirror-down position (shown in FIG. 5) toward the mirror-up position (shown in FIG. 10). A rotation of the main mirror seat 16 from the mirror-down position (shown in FIG. 5) toward the mirror-up position causes the position of the sub-mirror support shaft 18x, which pivotally supports the sub-mirror seat 18, to shift upward accordingly along a circular-arc-shaped path about the main-mirror support shaft 16x. In accordance with this movement of the sub-mirror support shaft 18x, the linkage pin 18g, which is provided at the end of the extension arm 18f, moves within the linkage hole 30a in a direction to approach the inner-diameter-side end surface 30a-3 while sliding on the linkage pin sliding surface 30a-1. At this stage, the stopper 18a moves in a direction toward the sub-mirror support shaft 18x (in a direction to approach the position of the sub-mirror support shaft 18x in the mirror-down state shown in FIG. 5) while being in contact with the position defining pin 26. The linkage control lever 30 slightly rotates clockwise until the linkage pin 18g comes into contact with the inner-diameter-side end surface 30a-3, and subsequently, the linkage pin 18g presses the linkage pin sliding surface 30a-1, which causes the linkage control lever 30 to rotate counterclockwise against the biasing force of the linkage-control-lever biasing spring 31. As shown in FIG. 6, during this counterclockwise rotation of the linkage control lever 30, a force in the direction of the arrow F1 shown in FIG. 6 acts on the linkage pin 18g due to a reaction force of the linkage-control-lever biasing spring 31. This force in the direction of the arrow F1 is for pressing the sub-mirror seat 18 in a direction toward the jutting-out position (in the counterclockwise direction); however, the engagement of the linkage pin 18g with the inner-diameter-side end surface 30a-3 prevents the sub-mirror seat 18 from rotating in this direction (counterclockwise direction).

Figure 7:
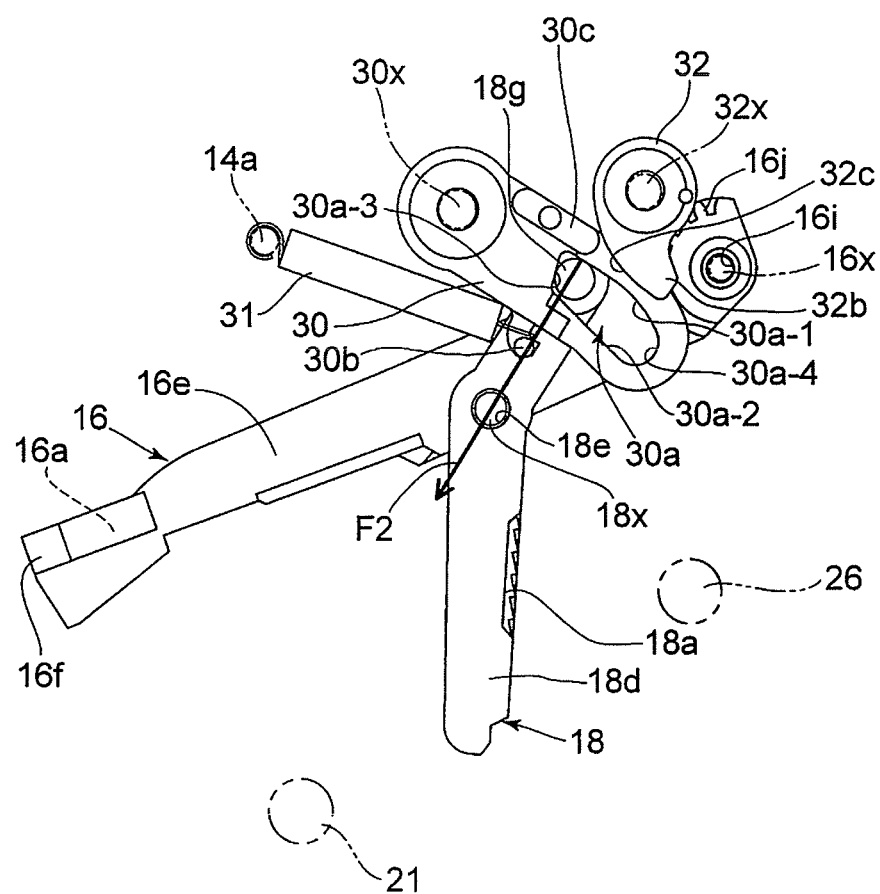
FIG. 7 is a side elevational view of the mirror drive mechanism at a moment in time at which a linkage control lever rotates in reverse during the process of moving from the mirror-down state to the mirror-up state.

Upon the main mirror seat 16 reaching the angle shown in FIG. 7 as a result of the subsequent rotation thereof in a direction toward the mirror-up position, the direction of the force applied to the linkage pin 18g from the linkage pin sliding surface 30a-1 by the biasing force of the linkage-control-lever biasing spring 31 changes from the direction of the arrow F1 to the direction of the arrow F2 shown in FIG. 7. Thereupon, the sub-mirror seat 18 is not in a state of being pressed in a direction toward the jutting out position since the center (axis) of the sub-mirror support shaft 18x lies on the direction of this force applied to the linkage pin 18g.

Upon the main mirror seat 16 rotating in the direction toward the mirror-up position beyond the position shown in FIG. 7, the force of the linkage control lever 30 which presses the linkage pin 18g by the biasing force of the linkage-control-lever biasing spring 31 acts as a force which rotates the sub-mirror seat 18 toward the retracted position. When the main mirror seat 16 rotates in the direction toward the mirror-up position from the state shown in FIG. 7, the linkage pin 18g continues to move in the linkage hole 30a while sliding on the linkage pin contacting surface 30a-1 until coming into contact with the outer-diameter-side end surface 30a-4, which causes the sub-mirror seat 18 to rotate widely toward the retracted position. Simultaneously, the linkage control lever 30 rotates clockwise by the biasing force of the linkage-control-lever biasing spring 31.

Further rotation of the main mirror seat 16 in the direction toward the mirror-up position causes the sub-mirror seat 18 to follow the rotation of the main mirror seat 16, moving upward. While moving upward, the rotation of the main mirror seat 16 in this direction causes the linkage pin 18g of the sub-mirror seat 18 to be pressed by the linkage pin sliding surface 30a-1 of the linkage control lever 30, thereby rotating the sub-mirror seat 18 progressively in the direction toward the retracted position relative to the main mirror seat 16. In accordance with this rotation of the sub-mirror seat 18, the sub-mirror 17 is progressively retracted to the back side of the main mirror 15 while the mirror support base 18b is approaching the mirror support base 16c. Subsequently, upon the main mirror seat 16 reaching the mirror-up position shown in FIG. 10, the sub-mirror seat 18 reaches the retracted position, in which the mirror support base 18b lies alongside and substantially parallel to the back of the main mirror support base 16c, so that the mirror drive mechanism is in the mirror-up state, in which the sub-mirror 17 is retracted in the back of the main mirror 15.

In the above described mirror-up operation, a rotational force is transmitted from the transmission gear 16j of the main mirror seat 16 to the driven gear 32a of the vibration control member 32 to cause the vibration control lever 32 to rotate counterclockwise from the first position, in which the vibration control arm 32b is directed downward, to the second position, in which the vibration control arm 32b is directed toward the rear in the optical axis direction (horizontal direction with respect to FIG. 1). This rotation of the vibration control lever 32 constitutes a rotation in a direction to cause the vibration control arm 32b to move away from the arm contacting portion 30c of the linkage control lever 30.

Figure 16:
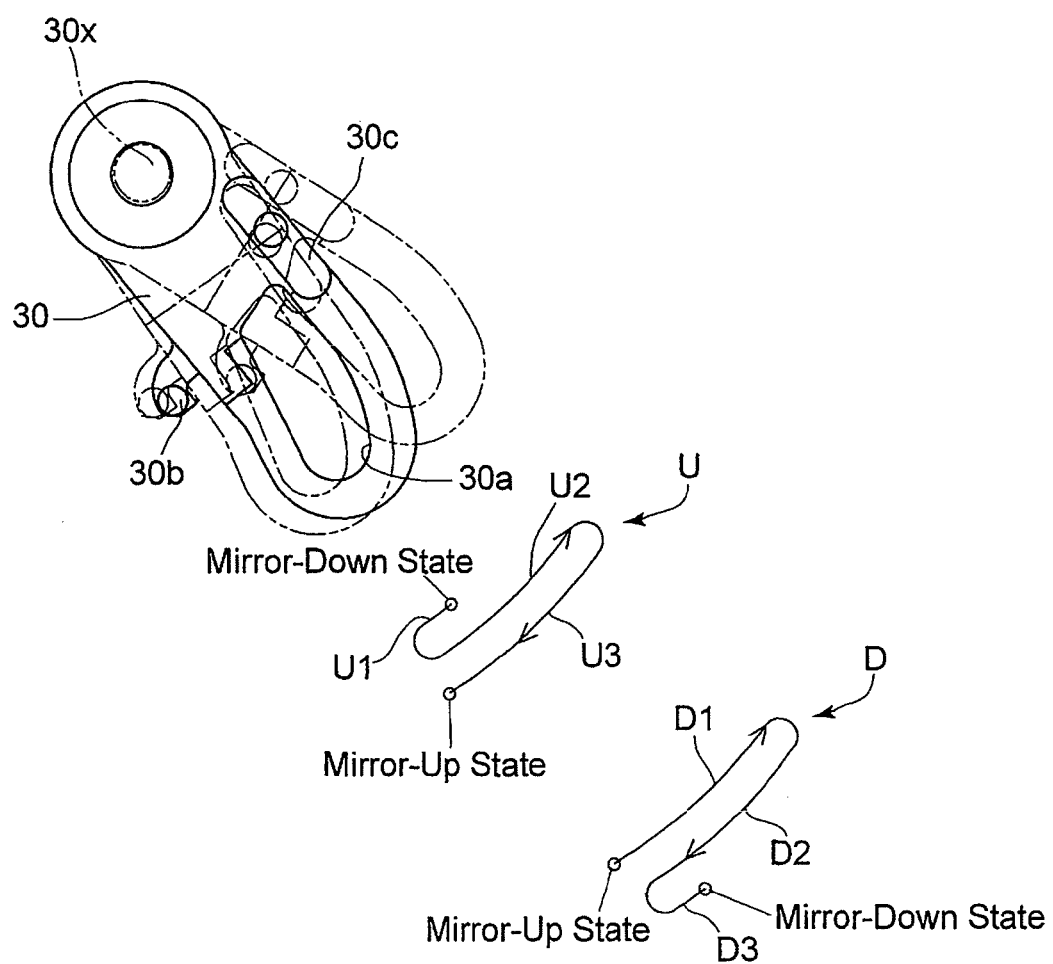
FIG. 16 is a diagram showing operations of the linkage control lever only.

On the other hand, with the mirror-up operation, the linkage control lever 30 swings in accordance with the moving path thereof shown by the letter U in FIG. 16. Namely, the letter U in FIG. 16 designates a moving path of the arm contacting portion 30c of the linkage control lever 30. As described above, the linkage control lever 30 slightly rotates in the clockwise direction that corresponds to the biasing direction by the linkage control lever biasing spring 31 from the mirror-down state shown in FIG. 5 (in a clockwise rotational-movement section U1 of the moving path U), and subsequently, the linkage control lever 30 is pressed by the linkage pin 18g to rotate counterclockwise against the biasing force of the linkage control lever biasing spring 31 (in a counterclockwise rotational-movement section U2 of the moving path U). FIG. 6 shows a state where the linkage control lever 30 is in the process of rotating counterclockwise in the counterclockwise rotational-movement section U2 of the moving path U. Upon the main mirror seat 16 moving beyond the position shown in FIG. 7, the direction of rotation of the linkage control lever 30 is reversed from counterclockwise to clockwise; more specifically, the linkage control lever 30 stops rotating counterclockwise in the counterclockwise rotational-movement section U2, in which the linkage control lever 30 is raised by the linkage pin 18g, to start rotating clockwise in a clockwise rotational-movement section U3 of the moving path U, in which the linkage control lever 30 depresses the linkage pin 18g, and this clockwise rotation of the linkage control lever 30 in the clockwise rotational-movement section U3 causes the sub-mirror 18 to rotate to the retracted position. FIG. 9 shows a state where the linkage control lever 30 is in the process of rotating clockwise in the clockwise rotational-movement section U3 of the moving path U. The linkage control lever 30 has reached the rotational end in the clockwise direction in the mirror-up state shown in FIG. 10. Namely, the linkage control lever 30 rotates in a direction to make the arm contacting portion 30c approach the vibration control arm 32b of the vibration control lever 32 (counterclockwise in the counterclockwise rotational-movement section U2) until the reversing position shown in FIG. 7, where the direction of rotation of the linkage control lever 30 is reversed, and subsequently rotates in a direction to rotate the arm contacting portion 30c away from the vibration control arm 32b of the vibration control lever 32 (clockwise in the clockwise rotational-movement section U3). During this rotation of the linkage control lever 30, the vibration control lever 32 rotates in a direction toward the second position to keep the vibration control arm 32b away from the arm contacting portion 30c; however, since the linkage control lever 30 also moves in a direction to follow the vibration control lever 32 during the counterclockwise rotation in the counterclockwise rotational-movement section U2, the vibration control lever 32 is positioned relative to the linkage control lever 30 so that the arm contacting portion 30c is close to the contact cam surface 32c of the vibration control arm 32b at the reversing position of the linkage control lever 30 shown in FIG. 7.

A slight clearance is provided (and is determined at the design stage) between the arm contacting portion 30c and the contact cam surface 32c to prevent the arm contacting portion 30c and the contact cam surface 32c from contacting each other even in the state shown in FIG. 7, in which the arm contacting portion 30c is positioned close to the contact cam surface 32c, at the time the main mirror 15 is in the mirror-up position. More specifically, the amount of rotation (the angle of rotation) of the vibration control lever 32 has been increased by the setting of the gear ratio between the transmission gear 16j and the driven gear 32a to prevent the vibration control arm 32b and the arm contacting portion 30c from interfering with each other in the state shown in FIG. 7. However, due to a slight operating error, there is a possibility of the timing of the reverse rotation of the linkage control lever 30 being delayed. FIG. 8 shows such a state, in which the contact cam surface 32c is in contact with the arm contacting portion 30c. The contact cam surface 32c is a curved convex surface, and the portion of the arm contacting portion 30c which comes into contact with this curved convex surface (i.e., the radially outer end of the arm contacting portion 30c) is also a semicircular arc surface, so that the contact cam surface 32c and the arm contacting portion 30c come into contact with each other in a linear section parallel to the axes of the linkage lever support shaft 30x and the vibration control lever support shaft 32x. Subsequently, upon the contact cam surface 32c and the arm contacting portion 30c coming into contact with each other as shown in FIG. 8, as a reaction force against this a force in the direction of the arrow F3 shown in FIG. 8 acts on the arm contacting portion 30c from the contact cam surface 32c. From this force in the direction of the arrow F3, a component of force which causes the linkage control lever 30 to rotate clockwise occurs. Thereupon, a force in the direction of the arrow F4 shown in FIG. 8 acts on the linkage pin 18g of the sub-mirror seat 18. When the components shown in FIG. 8 have the relative positional relationship shown in FIG. 8, the force in the direction of the arrow F4 that presses the linkage pin 18g acts in a direction to rotate the sub-mirror seat 18 to the retracted position, and the sub-mirror seat 18 can rotate in a direction toward the retracted position while making the linkage pin 18g slide on the linkage pin sliding surface 30a-1 in a direction away from the inner-diameter-side end surface 30a-3. To achieve this operation, the shapes of the contact cam surface 32c and the arm contacting portion 30c are determined so that the maximum pressure angle (see FIG. 8) between a tangent line T to a circular arc centered about the linkage lever support shaft 30x (defined by a rotation direction of the linkage control lever 30) and the arrow F3 is equal to or smaller than 60 degrees. Accordingly, even if the timing of the reverse rotation of the linkage control lever 30 is slightly delayed as shown in FIG. 8, there is no possibility of the operation of either the linkage control lever 30 or the sub-mirror seat 18 being locked by interference of the vibration control lever 32, which makes it possible to make the main mirror seat 16 continue rotating to the mirror-up position by reversing the rotation direction of the linkage control lever 30.

FIGS. 11 through 15 show operations of the bounce suppressing mechanism, which operates in association with the mirror drive mechanism, when the main mirror seat 16 that supports the main mirror 15 rotates from the mirror-up position (shown in FIG. 10) toward the mirror-down position (shown in FIG. 5). A rotation of the main mirror seat 16 from the mirror-up position toward the mirror-down position causes the position of the sub-mirror support shaft 18x, which pivotally supports the sub-mirror seat 18, to shift downward accordingly along a circular-arc-shaped path about the main-mirror support shaft 16x. In accordance with this movement of the sub-mirror support shaft 18x, the sub-mirror seat 18 displaces the linkage pin 18g in the linkage hole 30a in a direction to approach the outer-diameter-side end surface 30a-4. The sub-mirror seat 18 rotates integrally with the main mirror seat 16 until the linkage pin 18g reaches the position of the outer-diameter-side end surface 30a-4. Upon the main mirror seat 16 rotating, toward the mirror-down position, to the position where the linkage pin 18g comes into contact with the outer-diameter-side end surface 30a-4, the linkage pin 18g presses the linkage pin sliding surface 30a-1 and the outer-diameter-side end surface 30a-4 of the linkage control lever 30, which causes the linkage control lever 30 to rotate counterclockwise against the biasing force of the linkage control lever biasing spring 31. During this counterclockwise rotation of the linkage control lever 30, a force in the direction of the arrow F5 shown in FIG. 11 acts on the linkage pin 18g by a reaction force of the linkage control lever biasing spring 31 when the linkage pin 18g presses the linkage pin sliding surface 30a-1. This force in the direction of the arrow F5 is for pressing the sub-mirror seat 18 in a direction toward the retracted position; however, the engagement of the linkage pin 18g with the outer-diameter-side end surface 30a-4 prevents the sub-mirror seat 18 from rotating in this direction, so that the sub-mirror seat 18 does not move back toward the retracted position and presses the linkage control lever 30.

Figure 12:
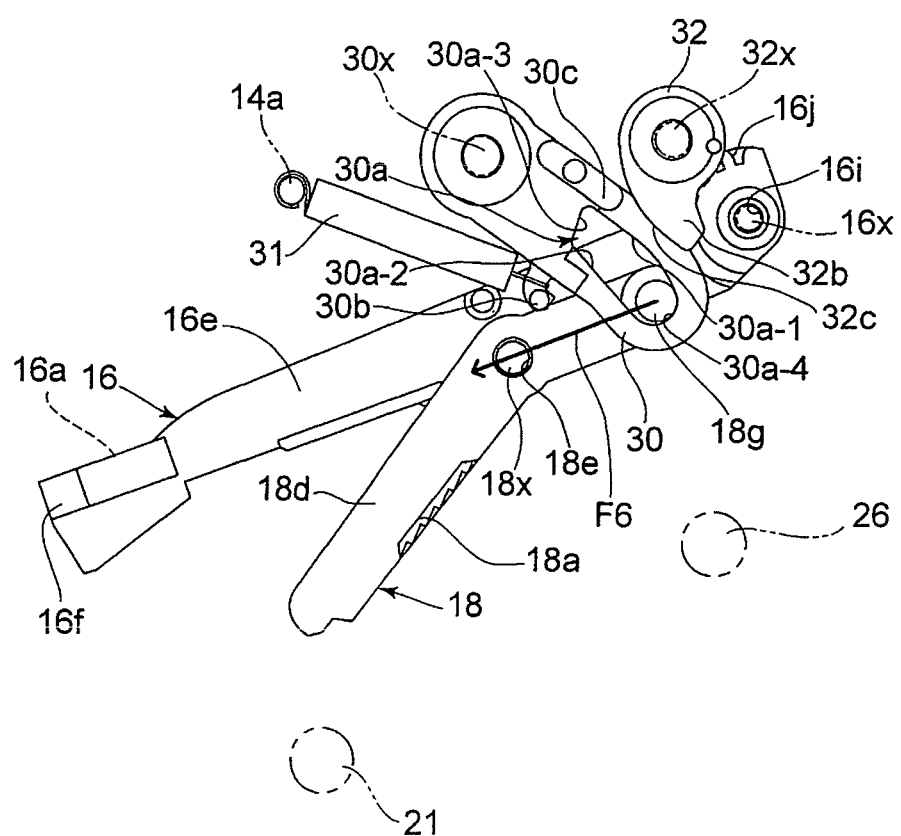
FIG. 12 is a side elevational view of the mirror drive mechanism at a moment in time at which the linkage control lever rotates in reverse during the process of moving from the mirror-up state to the mirror-down state.

Upon the main mirror seat 16 reaching the angle shown in FIG. 12 as a result of the subsequent rotation thereof in a direction toward the mirror-down position, the direction of the force applied to the linkage pin 18g from the linkage pin sliding surface 30a-1 by the biasing force of the linkage-control-lever biasing spring 31 changes from the direction of the arrow F5 to the direction of the arrow F6 shown in FIG. 12. Thereupon, since the center (axis) of the sub-mirror support shaft 18x lies on a line extending in the direction of this force applied to the linkage pin 18g, the sub-mirror seat 18 is in a state of not being pressed in a direction toward the retracted position.

Figure 14:
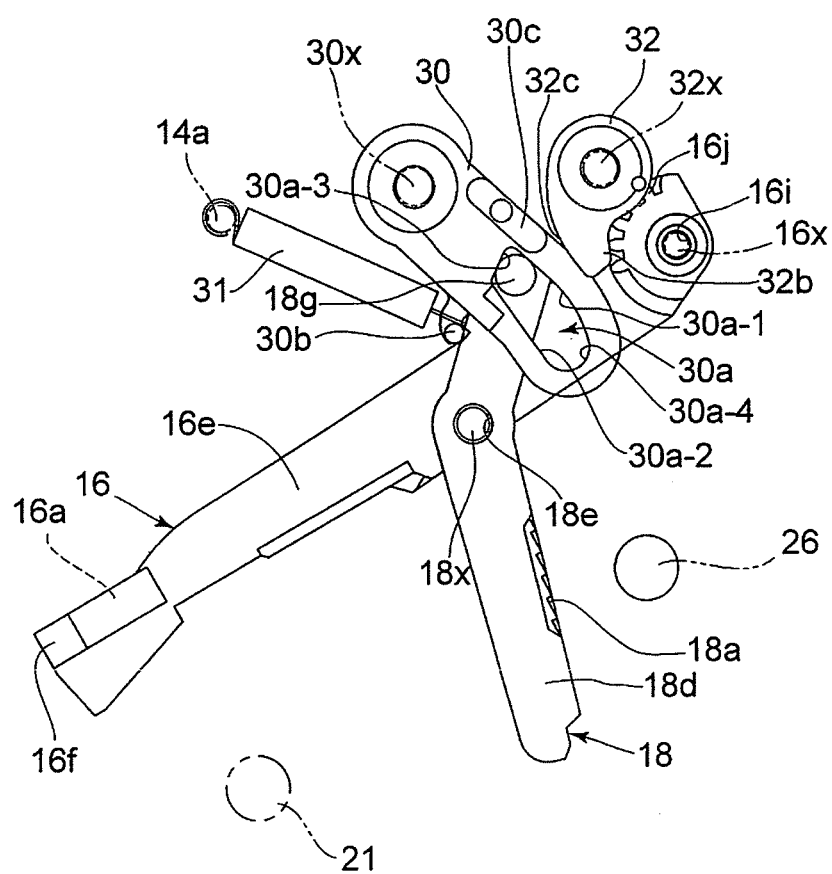
FIG. 14 is a side elevational view of the mirror drive mechanism in a state after the linkage control lever rotates in reverse during the process of moving from the mirror-up state to the mirror-down state.

Upon the main mirror seat 16 rotating in the direction toward the mirror-down position beyond the position shown in FIG. 12, the linkage control lever 30 reaches the rotational end in the counterclockwise direction, and the force of the linkage control lever 30 which presses the linkage pin 18g by the biasing force of the linkage-control-lever biasing spring 31 acts as a force which brings the sub-mirror seat 18 to rotate toward the jutting-out position. Thereupon, as shown in FIG. 14, the linkage pin 18g moves toward the inner-diameter-side end surface 30a-3 along the linkage pin contacting surface 30a-1, which causes the sub-mirror seat 18 to rotate widely toward the jutting-out position. Simultaneously, the linkage control lever 30 rotates clockwise by the biasing force of the linkage-control-lever biasing spring 31.

Figure 15:
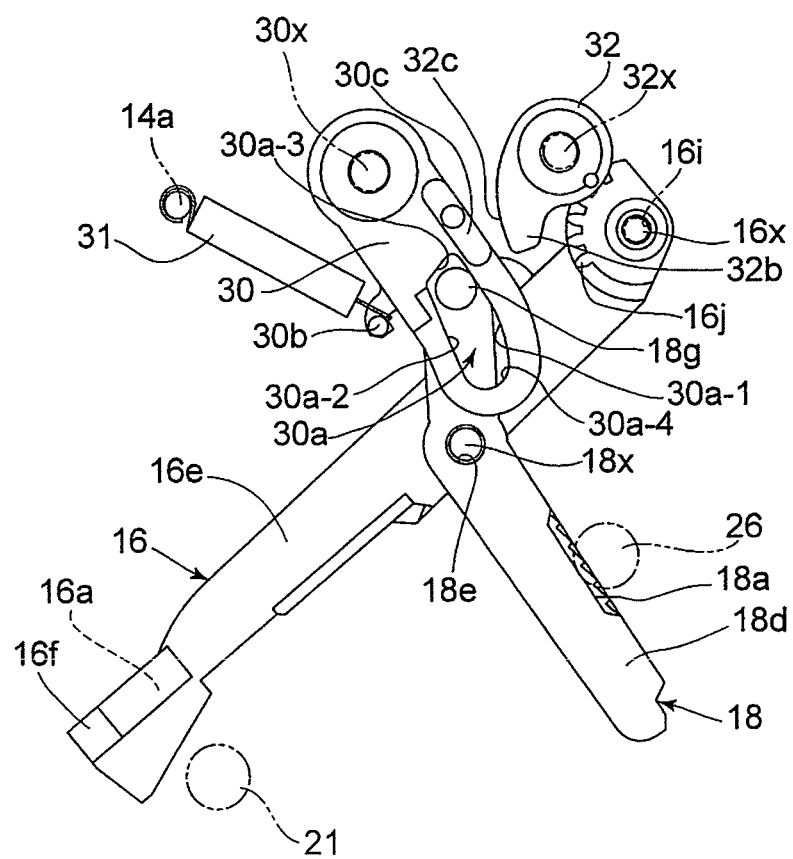
FIG. 15 is a side elevational view of the mirror drive mechanism in a state where the linkage control lever has reached the rotational end thereof in the clockwise direction while the sub-mirror seat is in contact with a position defining pin during the process of moving from the mirror-up state to the mirror-down state.

FIG. 15 shows a state where the linkage control lever 30 has reached the rotational end thereof in the clockwise direction, and at this stage the stopper 18a of the sub-mirror seat 18 is in contact with the position defining pin 26. From this state, a slightly rotation of the main mirror seat 16 counterclockwise causes the stopper 16a to come into contact with the position defining pin 21, so that the mirror drive mechanism is in the mirror-down state shown in FIG. 5. During the time from the state shown in FIG. 15 until the mirror-down state shown in FIG. 5, the linkage control lever 30 is slightly rotated counterclockwise while displacing the position of the linkage pin 18g in the linkage hole 30a in a direction away from the inner-diameter-side end surface 30a-3. During this counterclockwise rotation of the linkage control lever 30, the stopper 18a moves while remaining in contact with the position defining pin 26.

In the above described mirror-down operation, a rotational force is transmitted from the transmission gear 16j of the main mirror seat 16 to the driven gear 32a of the vibration control lever 32 to cause the vibration control lever 32 to rotate clockwise from the second position, in which the vibration control arm 32b is directed toward the rear in the optical axis direction (horizontal direction with respect to FIG. 1), to the first position, in which the vibration control arm 32b is directed downward. This rotation of the vibration control lever 32 is a rotation in a direction to bring the vibration control arm 32b to approach the arm contacting portion 30c of the linkage control lever 30.

Figure 11:
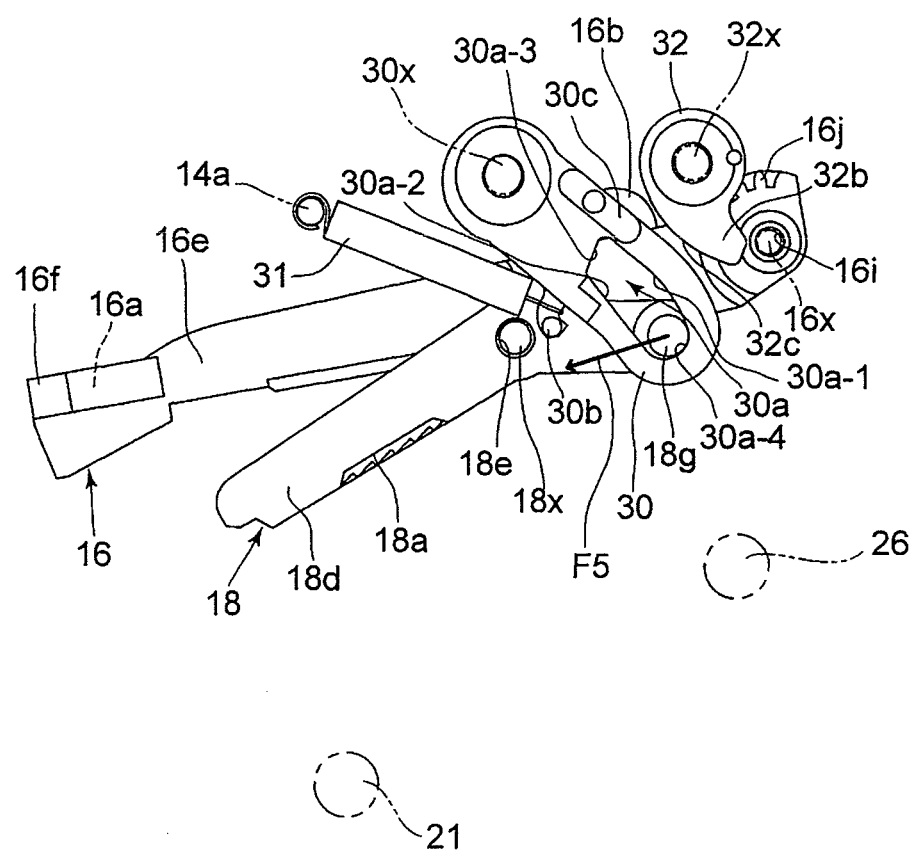
FIG. 11 is a side elevational view of the mirror drive mechanism during the process of moving from the mirror-up state to the mirror-down state.

On the other hand, during the mirror-down operation, the linkage control lever 30 swings in the moving manner shown by the letter D in FIG. 16. The letter D in FIG. 16 shows a moving path of the arm contacting portion 30c of the linkage control lever 30. As described above, from the mirror-up state that is shown in FIG. 10 until passing through the position shown in FIG. 12, the linkage control lever 30 continues to be pressed by the linkage pin 18g to rotate counterclockwise against the biasing force of the linkage control lever biasing spring 31 (in a counterclockwise rotational-movement section D1 of the moving path D). FIG. 11 shows a state where the linkage control lever 30 is in the process of rotating counterclockwise in the counterclockwise rotational-movement section D1 of the moving path D. Upon the main mirror seat 16 moving beyond the position shown in FIG. 12, the direction of rotation of the linkage control lever 30 is reversed from counterclockwise to clockwise; more specifically, the linkage control lever 30 stops rotating counterclockwise in the counterclockwise rotational-movement section D1, in which the linkage control lever 30 is raised by the linkage pin 18g, to start rotating clockwise in a clockwise rotational-movement section D2 of the moving path D, in which the linkage control lever 30 depresses the linkage pin 18g, and this clockwise rotation of the linkage control lever 30 in the clockwise rotational-movement section D2 causes the sub-mirror 18 to rotate to the jutting-out position. The linkage control lever 30 has reached the rotational end in the clockwise direction in the mirror-up state shown in FIG. 15, and the linkage control lever 30 is rotated reverse by a slight amount in the counterclockwise direction until moving to the mirror-down state shown in FIG. 5 (in a counterclockwise rotational-movement section D3 of the moving path D). Namely, the linkage control lever 30 rotates in a direction to make the arm contacting portion 30c approach the vibration control arm 32b of the vibration control lever 32 (counterclockwise in the counterclockwise rotational-movement section D1) until the reversing position shown in FIG. 12, at which the direction of rotation of the linkage control lever 30 is reversed, and subsequently rotates in a direction to keep the arm contacting portion 30c away from the vibration control arm 32b of the vibration control lever 32 (clockwise in the clockwise rotational-movement section D2). During this rotation of the linkage control lever 30, the vibration control lever 32 rotates in a direction toward the first position to make the vibration control arm 32b approach the arm contacting portion 30c, and the vibration control lever 32 is positioned relative to the linkage control lever 30 so that the arm contacting portion 30c is close to the contact cam surface 32c of the vibration control arm 32b at the reversing position of the linkage control lever 30 shown in FIG. 12.

Figure 13:
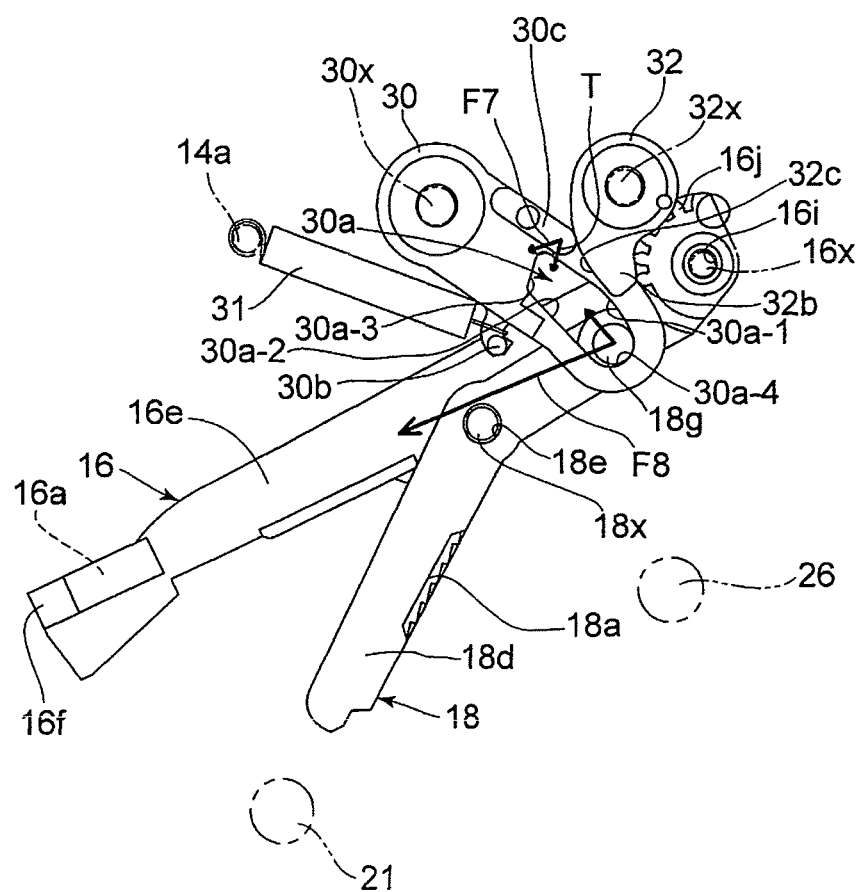
FIG. 13 is a side elevational view of the mirror drive mechanism in the case where the timing at which the linkage control lever rotates in reverse delays from the timing shown in FIG. 12 due to some reason.

Similar to the time during the mirror-up operation, a slight clearance is provided, at the design stage, between the arm contacting portion 30c and the contact cam surface 32c to prevent the arm contacting portion 30c and the contact cam surface 32c from contacting each other even in the state shown in FIG. 12, in which the arm contacting portion 30c is positioned close to the contact cam surface 32c, at the time the main mirror 15 is in the mirror-down position. However, there is a possibility of the timing of the reverse rotation of the linkage control lever 30 being delayed due to a slight operational error. FIG. 13 shows such a state, in which the contact cam surface 32c is in contact with the arm contacting portion 30c. Upon the contact cam surface 32c and the arm contacting portion 30c coming into contact with each other, as a reaction force thereagainst, a force in the direction of the arrow F7 shown in FIG. 13 acts on the arm contacting portion 30c from the contact cam surface 32c. From this force in the direction of the arrow F7, a component of force which causes the linkage control lever 30 to rotate clockwise occurs. Thereupon, a force in the direction of the arrow F8 shown in FIG. 13 acts on the linkage pin 18g of the sub-mirror seat 18 from the linkage pin sliding surface 30a-1 of the linkage control lever 30. When the components shown in FIG. 13 have the relative positional relationship shown in FIG. 13, the force in the direction of the arrow F8 that presses the linkage pin 18g acts in a direction to rotate the sub-mirror seat 18 to the jutting-out position, and the sub-mirror seat 18 becomes capable of rotating in a direction toward the jutting-out position while making the linkage pin 18g slide on the linkage pin sliding surface 30a-1 in a direction away from the outer-diameter-side end surface 30a-4. To achieve this operation, the shapes of the contact cam surface 32c and the arm contacting portion 30c are determined so that the maximum pressure angle (see FIG. 13) between a tangent line T to a circular arc centered about the linkage lever support shaft 30x (defined by a rotation direction of the linkage control lever 30) and the arrow F7 becomes equal to or smaller than 60 degrees. Accordingly, even if the timing of the reverse rotation of the linkage control lever 30 is slightly delayed as shown in FIG. 13, there is no possibility of the operation of either the linkage control lever 30 or the sub-mirror seat 18 being locked by interference of the vibration control lever 32, which makes it possible to make the main mirror seat 16 continue rotating to the mirror-down position by reversing the rotation direction of the linkage control lever 30. Since the rotation direction of the vibration control lever 32 during the mirror-down operation, in particular, is a direction to press the linkage control lever 30 in the direction of the arrow F7, the vibration control lever 32 functions to assist the linkage control lever 30 to rotate in reverse.

At the final stage of the mirror-down operation, the linkage control lever 30 rotates counterclockwise from the rotational end thereof in the clockwise direction shown in FIG. 15 to the position shown in FIG. 5 (counterclockwise in the counterclockwise rotational-movement section D3 in FIG. 16). In addition, the vibration control lever 32 rotates counterclockwise toward the first position. This narrows the clearance between the arm contacting portion 30c of the linkage control lever 30 and the contact cam surface 32c of the vibration control arm 32b of the vibration control lever 32. Although the sub-mirror seat 18 has reached the jutting-out position, in which the stopper 18a is engaged with the position defining pin 26, in the state shown in FIG. 15, there is a possibility of the sub-mirror seat 18 exhibiting a bouncing behavior in a direction toward the retracted position due to the shock of collision between the stopper 18a and the position defining pin 26 during the time until the main mirror seat 16 finally reaches the mirror-down position. This sort of bouncing of the sub-mirror seat 18 can be reduced by the vibration control lever 32. More specifically, if the sub-mirror seat 18 attempts to rotate in a direction toward the retracted position when the mirror drive mechanism moves from the state shown in FIG. 15 to the state shown in FIG. 5, the linkage control lever 30 is pressed counterclockwise by the linkage pin 18g. At this point, the contact cam surface 32c of the vibration control lever 32 faces the arm contacting portion 30c with a slight clearance therebetween, and the range of movement of the linkage control lever 30 is limited by engagement of the arm contacting portion 30c with the contact cam surface 32c. More specifically, since the main mirror seat 16 that rotates the vibration control lever 32 has a sufficiently large moment of inertia with respect to the sub-mirror seat 18 and since the transmission gear 16j and the driven gear 32a, which are located at the point where the main mirror seat 16 and the vibration control lever 32 are connected (engaged), are in close vicinity of the main mirror support shaft 16x (the distance between the transmission gear 16j and the driven gear 32a in a radial direction of the main mirror support shaft 16x is short), a moment which is sufficiently large for the vibration control lever 32 to rotate the main mirror seat 16 is not created even if loads are exerted on the contact cam surface 32c from the arm contacting portion 30c. Accordingly, the linkage control lever 30 is prevented from rotating counterclockwise with the contacting cam surface 32c abutting against the arm contacting portion 30c, so that the range of movement of the linkage control lever 30 can be securely limited. If the linkage control lever 30 is prevented from rotating counterclockwise, the sub-mirror seat 18 is also prevented from rotating in a direction toward the retracted position, so that bouncing of the sub-mirror 18 is suppressed. The distance between the contacting cam surface 32c and the arm contacting portion 30c gradually reduces as the mirror drive mechanism moves closer to the mirror-down state shown in FIG. 5 from the state shown in FIG. 15, so that the range of movement of the linkage control lever 30 is gradually limited, and the effect of suppressing bouncing of the sub-mirror seat 18 becomes maximum when the mirror drive mechanism is in the mirror-down state shown in FIG. 5. As described above, in a state where the sub-mirror seat 18 does not bounce in the mirror-down position, a clearance is secured between the contact cam surface 32c and the arm contacting portion 30c so that the contact cam surface 32c and the arm contacting portion 30c do not come into contact with each other, which allows a slight variation of the relative position between the linkage control lever 30 and the vibration control lever 32 which is caused by adjustments made to the angles of the main mirror seat 16 and the sub-mirror seat 18.

Figure 17:
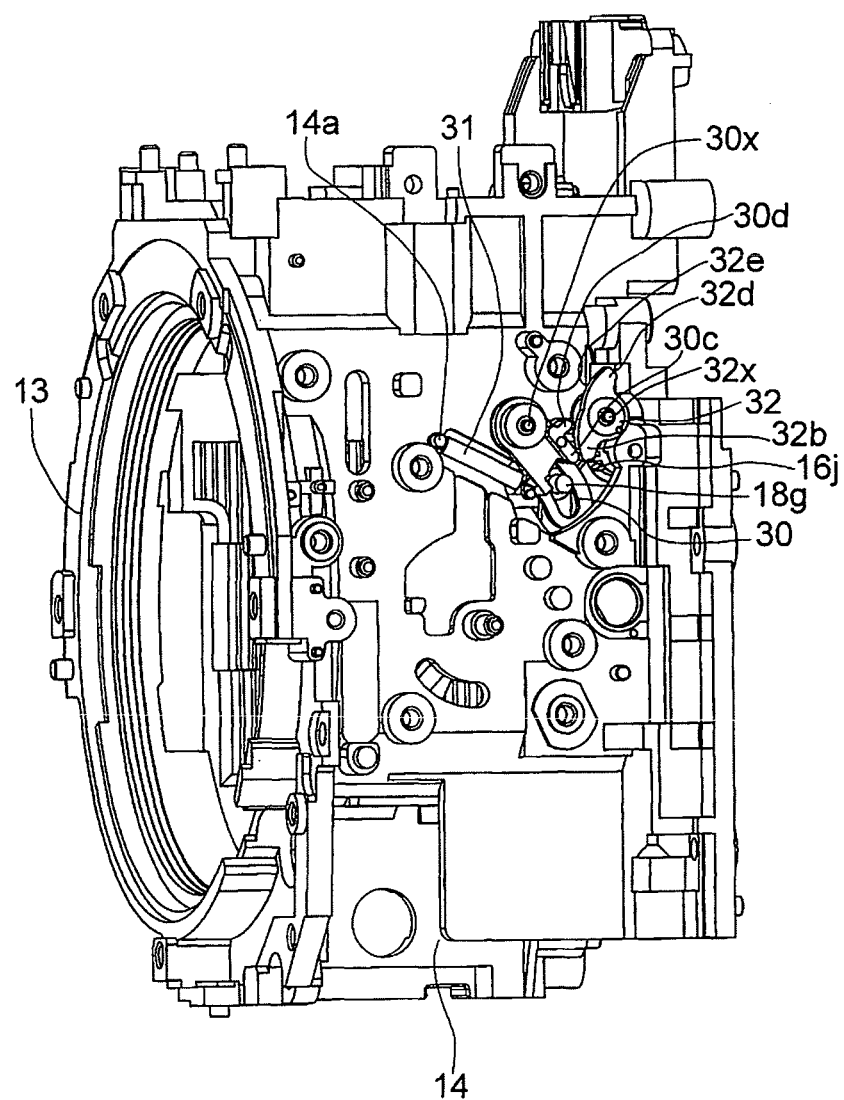
FIG. 17 is a perspective view of a mirror box unit of the SLR camera which incorporates a second embodiment of the mirror drive mechanism.
Figure 18:
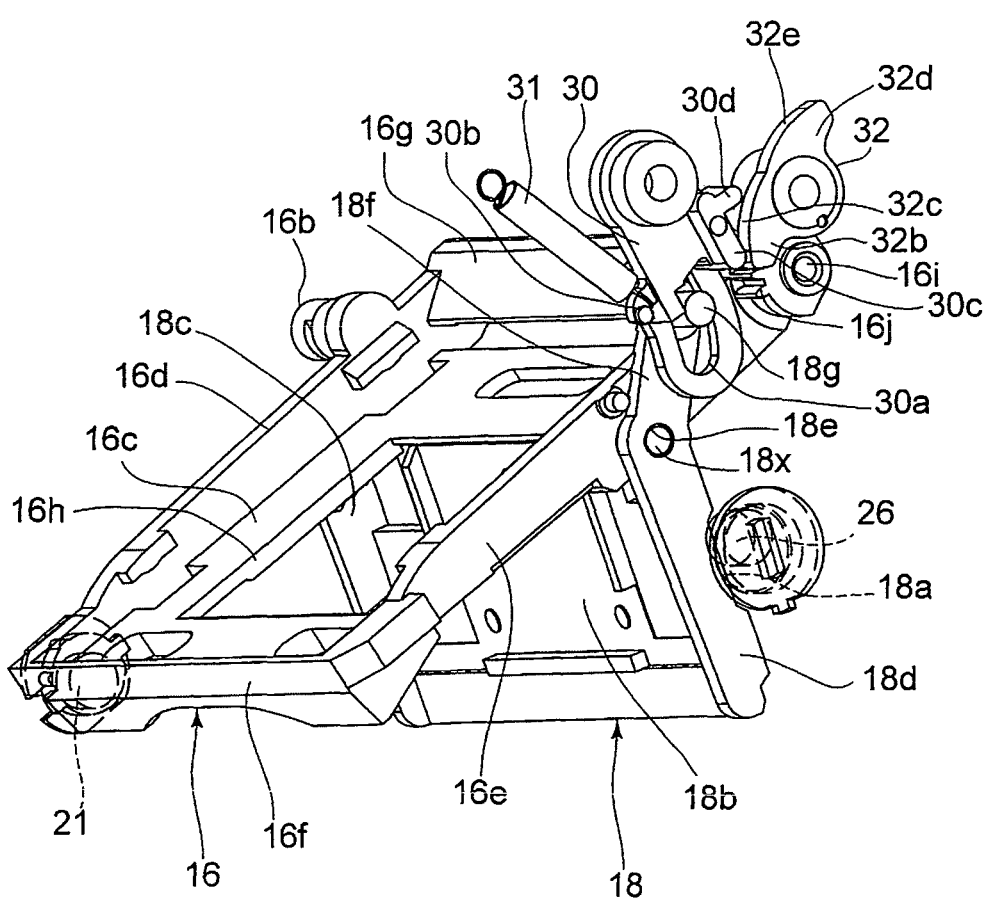
FIG. 18 is a perspective view of the second embodiment of the mirror drive mechanism in the mirror-down state.
Figure 19:
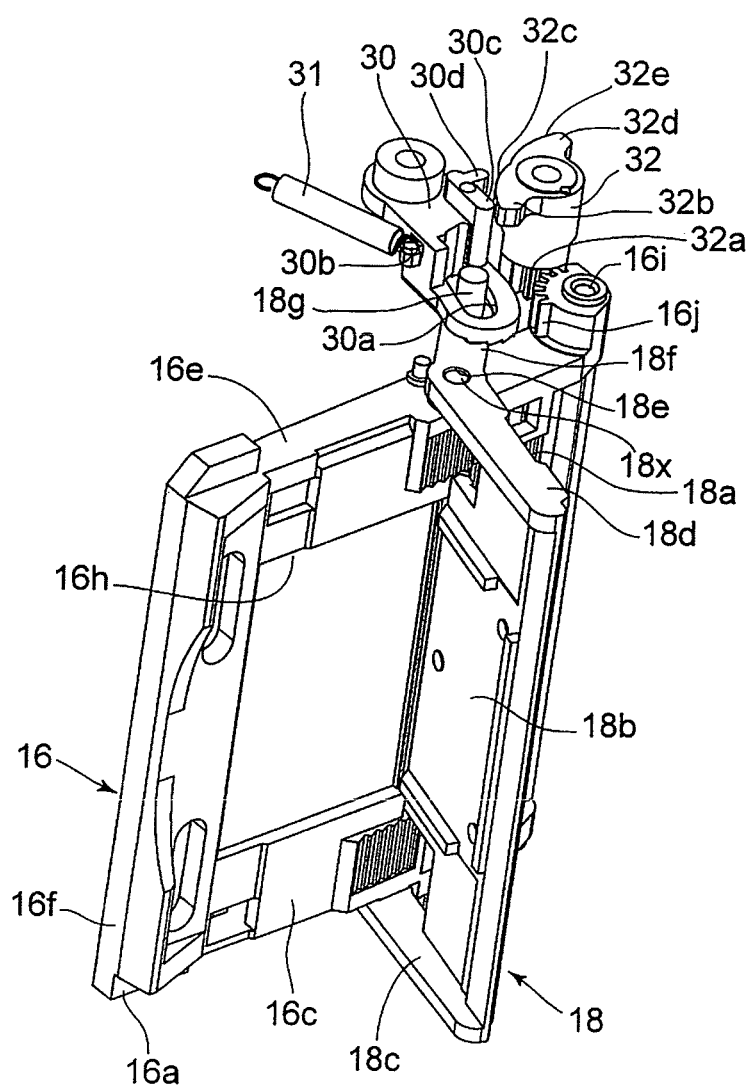
FIG. 19 is a perspective view of the second embodiment of the mirror drive mechanism in the mirror-down state, viewed from a different angle.
Figure 20:
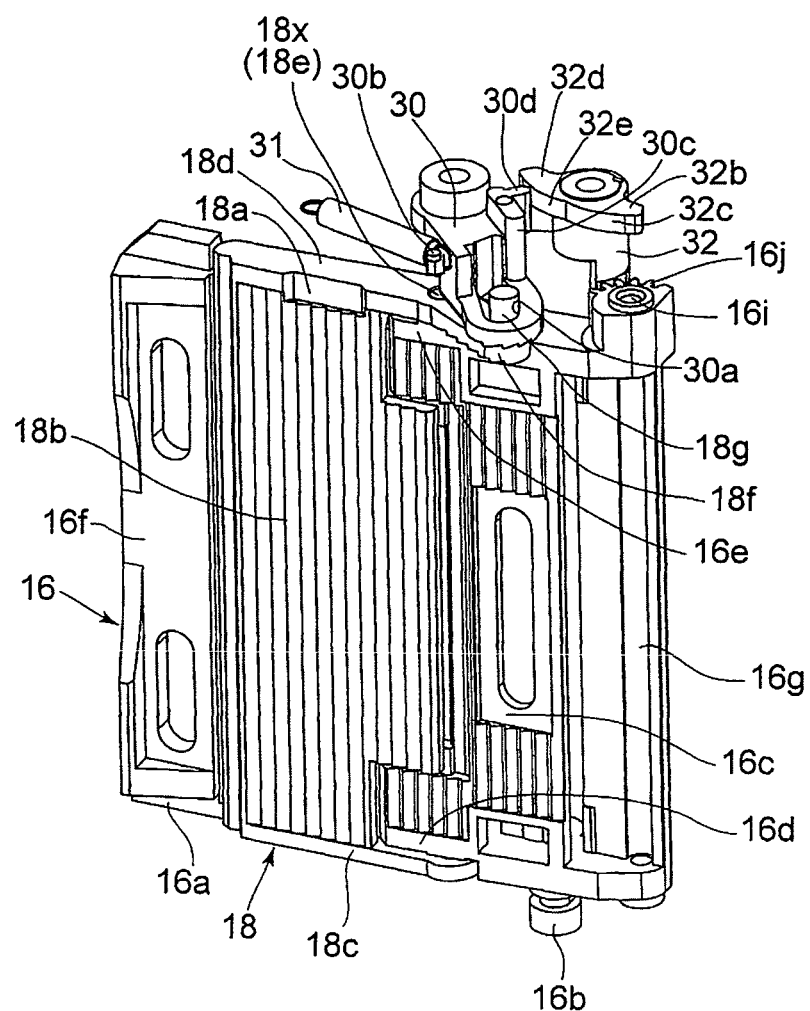
FIG. 20 is a perspective view of the second embodiment of the mirror drive mechanism in the mirror-up state.

Although the bouncing of the sub-mirror 17 (the sub-mirror seat 18) is suppressed by the vibration control lever 32 when the main mirror 15 rotates to the mirror-down position in the above described embodiment of the mirror drive mechanism, the bouncing of the sub-mirror 17 (the sub-mirror seat 18) can also be suppressed when the main mirror 15 rotates to the mirror-up position with the addition of a slight modification to the structure of the above described mirror drive mechanism. This modified embodiment will be discussed as a second embodiment of the mirror drive mechanism with reference to FIG. 17 onwards.

The basic components of the second embodiment are identical to those of the previous embodiment. The difference between the first embodiment and the second embodiment is in the shapes of the linkage control lever 30 and the vibration control lever 32. In the second embodiment of the mirror drive mechanism, the linkage control lever 30 is provided, on the arm contacting portion 30c in the vicinity of the inner-diameter-side end of the linkage lever support shaft 30x, with a second arm contacting portion (second contactable portion) 30d. Similar to both ends of the arm contacting portion 30c in the radial direction of rotation of the linkage control lever 30, the end of the second arm contacting portion 30d is formed to have a semicircular arc surface. In the second embodiment of the mirror drive mechanism, the vibration control lever 32 is provided with a second vibration control arm (second contactable portion) 32d which is shaped so that the second vibration control arm 32d and the vibration control arm 32b are substantially symmetrical with respect to a plane in which the axis of the vibration control lever support shaft 32x lies. Similar to the contact cam surface 32c of the vibration control arm 32b, a contact cam surface 32e in the shape of a curved convex surface is formed on the outer periphery of the vibration control arm 32d.

Figure 21:
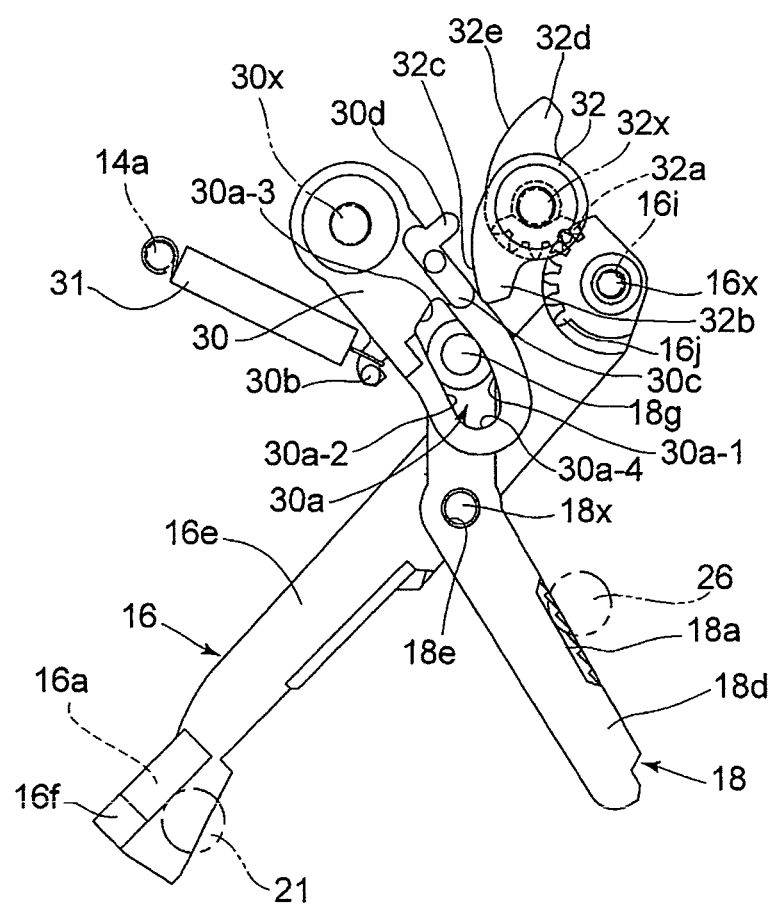
FIG. 21 is a side elevational view of the second embodiment of the mirror drive mechanism in the mirror-down state.

FIG. 21 shows the second embodiment of the mirror drive mechanism in the mirror-down state. In this state, the vibration control lever 32 is in the first position, and the contact cam surface 32c, which is formed on the vibration control arm 32b of the vibration control lever 32, is in close vicinity of the arm contacting portion 30c to suppress bouncing of the sub-mirror seat 18, while the contact cam surface 32e of the vibration control arm 32d is located at a position spaced apart from the second arm contact portion 30d.

Figure 22:
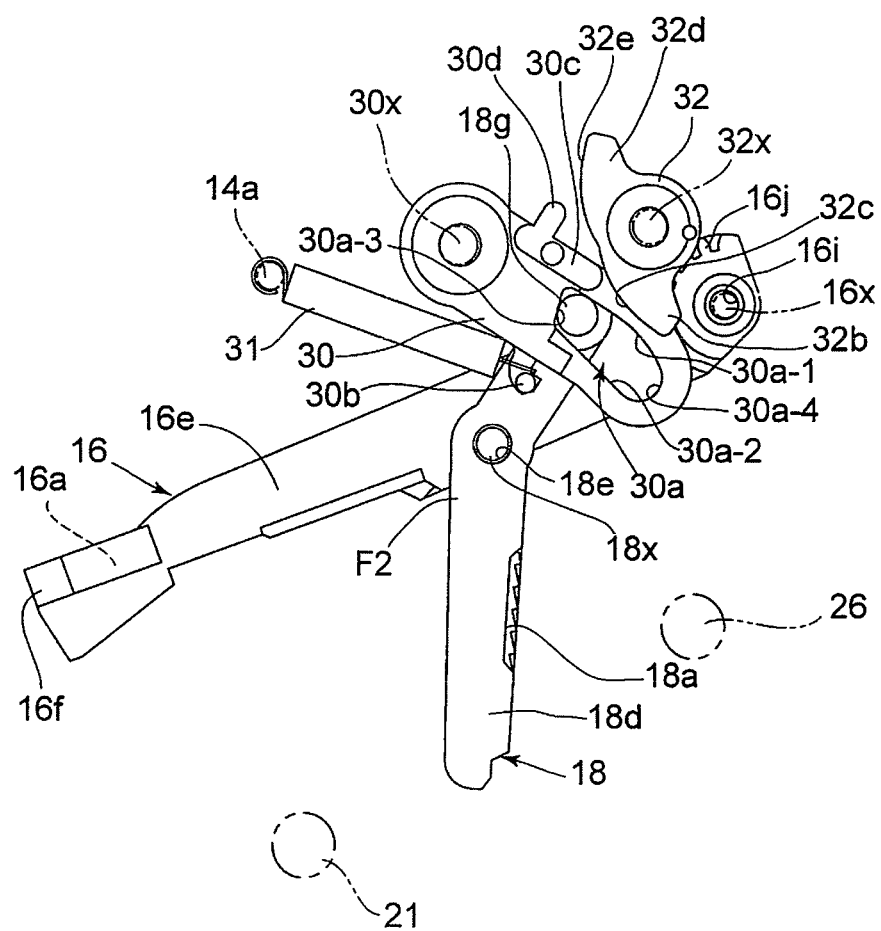
FIG. 22 is a side elevational view of the second embodiment of the mirror drive mechanism during the process of moving from the mirror-down state to the mirror-up state.

FIG. 22 shows a state where the second embodiment of the mirror drive mechanism in the process of moving from the mirror-downstate to the mirror-up state. More specifically, FIG. 22 shows a state where the linkage control lever 30 has reached the rotational end thereof in the counterclockwise direction, at which the direction of rotation of the linkage control lever 30 is reversed from counterclockwise to clockwise (from the counterclockwise rotational-movement section U2 to the clockwise rotational-movement section U3 of the moving path U in FIG. 16). Although the contact cam surface 32e of the second vibration control arm 32d and the second arm contacting portion 30d of the linkage control lever 30 are positioned closer to each other than when the main mirror 15 is in the mirror-down position, a clearance greater than a predetermined amount still exists between the contact cam surface 32e and the second arm contacting portion 30d, so that the positional relationship therebetween is not such that the contact cam surface 32e and the second arm contacting portion 30d come into contact with each other right away.

Figure 23:
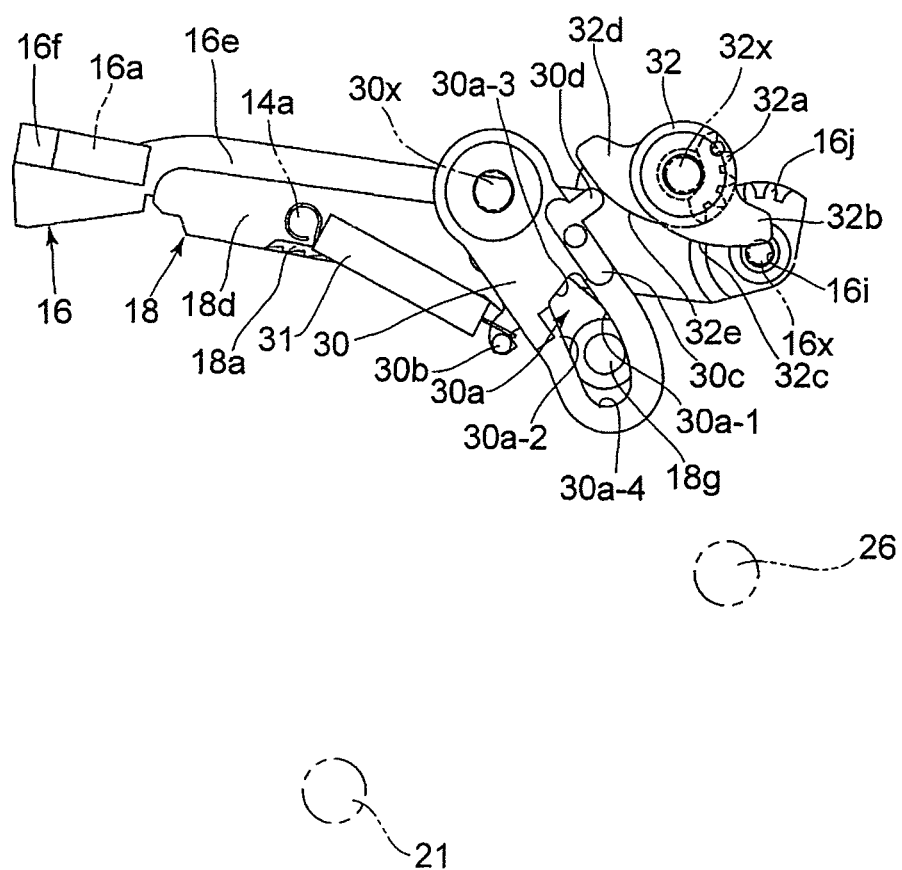
FIG. 23 is a side elevational view of the second embodiment of the mirror drive mechanism in the mirror-up state.

When the main mirror seat 16 rotates in the direction toward the mirror-up position from the state shown in FIG. 22, the linkage control lever 30 rotates clockwise in the clockwise rotational-movement section U3 of the moving path U in FIG. 16. Although this rotation of the linkage control lever 30 is a rotation in a direction to cause the arm contacting portion 30c of the linkage control lever 30 to move away from the vibration control lever 32, the second arm contact portion 30d moves in a different moving manner than the arm contact portion 30c due to the second arm contact portion 30d projecting in a different direction from that of the arm contact portion 30c. On the other hand, the vibration control lever 32 rotates toward the second position, and this rotation causes the contact cam surface 32e of the second vibration control arm 32d to progressively approach the second arm contact portion 30d. Subsequently, in the mirror-up state shown in FIG. 23, the vibration control lever 32 has reached the second position, and the contact cam surface 32e of the second vibration control arm 30d is close to the second arm contacting portion 30d. Accordingly, even if the sub-mirror seat 18 attempts to move toward the jutting-out position in the state shown in FIG. 23, the engagement of the second arm contacting portion 30d with the contact cam surface 32e prevents the linkage control lever 30 from rotating counterclockwise, so that the sub-mirror seat 18 can be stopped at the retracted position with stability. A clearance greater than a predetermined amount is provided between the contact cam surface 32e of the second vibration control arm 32d and the second arm contacting portion 30d of the linkage control lever 30 in the mirror-up state shown in FIG. 23, so that the contact cam surface 32e and the second arm contacting portion 30d do not come into contact with each other except when bouncing of the sub-mirror seat 18 is suppressed. Since no angular adjustments are made to the main mirror 15 when the main mirror 15 is in the mirror-up position and no angular adjustments are made to the sub-mirror 17 when the sub-mirror 17 is in the retracted position, the mirror drive mechanism can be modified so that a clearance enabling an angular adjustment is not provided between the contact cam surface 32e and the second arm contacting portion 30d in the mirror-up state shown in FIG. 23. The smaller the clearance between the contact cam surface 32e and the second arm contacting portion 30d is, the more the effect of suppressing bouncing of the sub-mirror 17 is enhanced.

Figure 24:
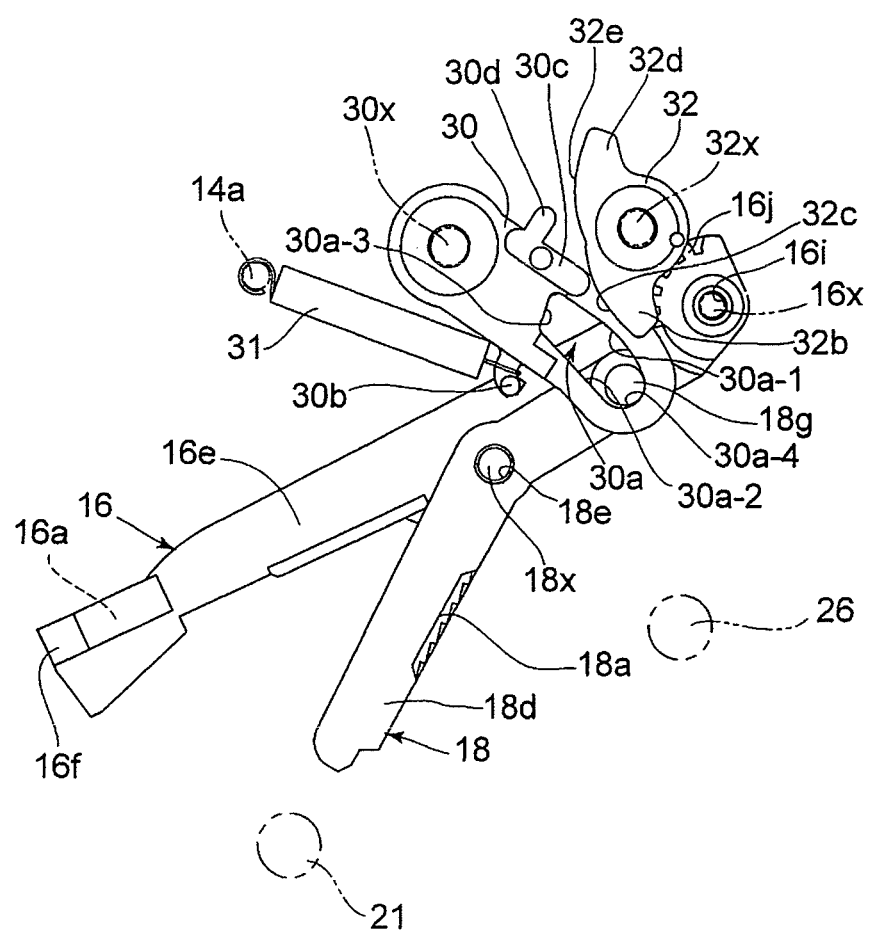
FIG. 24 is a side elevational view of the second embodiment of the mirror drive mechanism in the process of moving from the mirror-down state to the mirror-up state.

FIG. 24 shows the second embodiment of the mirror drive mechanism in the process of moving from the mirror-up state to the mirror-down state. More specifically, FIG. 24 shows a state where the linkage control lever 30 has reached the rotational end thereof in the counterclockwise direction, at which the direction of rotation of the linkage control lever 30 is reversed from counterclockwise to clockwise (from the counterclockwise rotational-movement section D1 to the clockwise rotational-movement section D2 of the moving path D). In this state, the contact cam surface 32e of the vibration control arm 32d and the second arm contact portion 30d of the linkage control lever 30 are spaced from each other by a greater amount than that when the mirror drive mechanism is in the mirror-up state, thus not interfering with rotation of the linkage control lever 30 by engagement between the contact cam surface 32e and the second arm contact portion 30d. Subsequently, upon the main mirror seat 16 further rotating to consequently reach the mirror-down position shown in FIG. 21, the contact cam surface 32e of the second vibration control arm 32d and the second arm contact portion 30d of the linkage control lever 30 are further spaced away from each other.

As described above, when the main mirror 15 is rotated to the mirror-down position or the mirror-up position, bouncing of the sub-mirror seat 18 is suppressed using the vibration control lever 32 that rotates in association with the main mirror seat 16, which makes it possible to achieve a mirror shock reduction of the sub-mirror 17 and an improvement in continuous shooting performance. The structure for suppressing bouncing of the sub-mirror 17 is for making the contact cam surface 32c or the contact cam surface 32e of the vibration control lever 32 abut against the arm contact portion 30c or the second arm contact portion 30d on the linkage control lever 30 that controls rotation of the sub-mirror seat 18, thus not requiring a complicated structure. In addition, since the vibration control lever 32 that serves as a vibration control member moves to a position to suppress bouncing of the sub-mirror 17 by rotating in association with rotation of the main mirror 15, the tolerance with respect to any deviation of the operational timing, etc., is greater than that in a type of vibration control mechanism in which a sub-mirror seat corresponding to the sub-mirror seat 18 is made to come into engagement with a stopper formed on a fixed member such as the mirror box 14, so that the possibility of an operating error occurring is small. Hence, bouncing of the sub-mirror can be suppressed reliably with a simple structure.

Although the present invention has been discussed based on the above illustrated embodiments, the present invention is not limited solely to these particular embodiments. For instance, although the mirror drive mechanism is structured to suppress bouncing of the sub-mirror seat 18 by engagement of the vibration control lever 32 with the linkage control lever 30 in each of the above illustrated embodiments, the mirror drive mechanism can also be structured to suppress bouncing of the sub-mirror seat 18 by making a vibration control member which corresponds to the vibration control lever 32 abut directly against the sub-mirror seat 18. As an example, by extending the linkage pin 18g of the sub-mirror seat 18 or providing the sub-mirror seat 18 with a contactable portion different from the linkage pin 18g in the above illustrated embodiments, the present invention can also be applied even if it uses a vibration control lever having a shape capable of coming into contact with the aforementioned extended linkage pin 18g or the aforementioned contactable portion (and lying in a plane in which the aforementioned extended linkage pin 18g or the aforementioned contactable portion lies).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A movable-mirror drive mechanism of a camera, comprising:
    a main mirror which is supported by a main-mirror holding frame and is driven to rotate between a viewfinder light-guiding position, in which said main mirror is positioned in a photographing optical path to reflect incident light, emanating from an object, toward a viewfinder optical system of said camera, and a retracted position, in which said main mirror is retracted from said photographing optical path to allow said object-emanating light to travel toward a photographic light-receiving medium;
    a sub-mirror which is supported by a sub-mirror holding frame that is supported by said main-mirror holding frame to be rotatable relative to said main-mirror holding frame, wherein said sub-mirror holding frame is positioned in a projecting position and said sub-mirror reflects part of said incident light emanating from said object in a direction different from a direction toward said viewfinder optical system when said main mirror is in said viewfinder light-guiding position, and wherein said sub-mirror holding frame is positioned in a sub-mirror retracted position and said sub-mirror is retracted with said main mirror from said photographing optical path when said main mirror is in said retracted position; and
    a vibration control member which rotates in direct response to rotation of said main-mirror holding frame, and holds said sub-mirror holding frame in said projecting position to prevent said sub-mirror holding frame from rotating toward said sub-mirror retracted position at least when said main mirror rotates to said viewfinder light-guiding position, wherein said main-mirror holding frame includes a gear and said vibration control member includes a gear, and said gears are engaged with each other so that a rotational force of said main-mirror holding frame is transmitted to said vibration control member via said gears.

2. The movable-mirror drive mechanism according to claim 1, further comprising a linkage control rotating member which is rotatable about a shaft that is parallel to a shaft of said vibration control member, wherein said linkage control rotating member rotates said sub-mirror holding frame between said projection position and said sub-mirror retracted position by rotating in association with said rotation of said main-mirror holding frame, wherein said linkage control rotating member includes a contactable portion and said vibration control member includes a contactable portion, said contactable portions lying in a plane in which said linkage control rotating member and said vibration control member rotate, and wherein, when said main-mirror holding frame rotates from said retracted position to said viewfinder light-guiding position, said vibration control member rotates in a direction to make said contactable portion of said linkage control rotating member approach said contactable portion of said vibration control member in order to limit, by engagement between said contactable portion of said linkage control rotating member and said contactable portion of said vibration control member, rotation of said linkage control rotating member in a direction to make said sub-mirror holding frame rotate toward said sub-mirror retracted position.

3. The movable-mirror drive mechanism according to claim 2, wherein said linkage control rotating member includes a second contactable portion and said vibration control member includes a second contactable portion, said second contactable portions lying in said plane in which said linkage control rotating member and said vibration control member rotate, and wherein, when said main-mirror holding frame rotates from said viewfinder light-guiding position to said retracted position, said vibration control member rotates in a direction to make said second contactable portion of said vibration control member approach said second contactable portion of said linkage control rotating member to limit, by engagement between said second contactable portion of said vibration control member and said second contactable portion of said linkage control rotating member, rotation of said linkage control rotating member in a direction to make said sub-mirror holding frame rotate toward said projecting position.

4. The movable-mirror drive mechanism according to claim 2, wherein, at a midpoint of rotation of said main mirror between said retracted position and said viewfinder light-guiding position, said linkage control rotating member rotates in a direction to approach said contactable portion of said vibration control member and subsequently rotates in a reverse direction away from said contactable portion of said vibration control member, and wherein said contactable portion of said vibration control member comprises a cam surface which gives said linkage control rotating member a component of force in a direction to press said linkage control rotating member in said reverse direction when said contactable portion of said linkage control rotating member comes into contact with said contactable portion of said vibration control member before said linkage control rotating member rotates in said reverse direction.

5. The movable-mirror drive mechanism according to claim 2, wherein said linkage control rotating member comprises an elongated hole, into which a projection, provided on said sub-mirror holding frame is inserted to be movable within said elongated hole, and wherein moving said projection in and along said elongated hole causes said sub-mirror holding frame, to rotate between said projecting position and said sub-mirror retracted position.

6. The movable-mirror drive mechanism according to claim 1, wherein said sub-mirror holding member includes a contactable portion and said vibration control member includes a contactable portion, said contactable portions lying in a plane in which said sub-mirror holding member and said vibration control member rotate, and wherein, when said main-mirror holding frame rotates from said retracted position to said viewfinder light-guiding position, said vibration control member rotates in a direction to make said contactable portion of said vibration control member approach said contactable portion of said sub-mirror holding member to limit, by engagement between said contactable portion of said vibration control member and said contactable portion of said sub-mirror holding member, rotation of said sub-mirror holding member toward said sub-mirror retracted position.

7. The movable-mirror drive mechanism according to claim 1, wherein said gears have a gear ratio such that said vibration control member rotates by a greater amount than a rotation amount of said main-mirror holding frame.

8. The movable mirror drive mechanism of a camera according to claim 1, a driving connection between said vibration control member and said main mirror holding frame being configured such that said vibration control member rotates by a larger amount than a rotation amount of said main mirror holding frame.

9. The movable mirror drive mechanism of a camera according to claim 1, said main mirror holding frame being configured to transmit rotation to said sub mirror holding frame by a first transmission mechanism, said main mirror holding frame being configured to transmit rotation to said vibration control member by a second transmission mechanism, the first transmission mechanism being distinct from the second transmission mechanism.

10. A movable-mirror drive mechanism of a camera, comprising:

a main mirror which is supported by a main-mirror holding frame and is driven to rotate between a viewfinder light-guiding position, in which said main mirror is positioned in a photographing optical path to reflect incident light, emanating from an object, toward a viewfinder optical system of said camera, and a retracted position, in which said main mirror is retracted from said photographing optical path to allow said object-emanating light to travel toward a photographic light-receiving medium;

a sub-mirror which is supported by a sub-mirror holding frame that is supported by said main-mirror holding frame to be rotatable relative to said main-mirror holding frame, wherein said sub-mirror holding frame is positioned in a projecting position and said sub-mirror reflects part of said incident light emanated from said object in a direction different from a direction toward said viewfinder optical system when said main mirror is in said viewfinder light-guiding position, and wherein said sub-mirror holding frame is positioned in a sub-mirror retracted position and said sub-mirror is retracted with said main mirror from said photographing optical path when said main mirror is in said retracted position; and a vibration control member which operates in direct response to rotation of said main-mirror holding frame, suppresses bouncing of said sub-mirror holding frame when said sub-mirror is positioned in at least one of said projecting position and said sub-mirror retracted position, and provides said sub-mirror holding frame with a pressing force in a direction corresponding to a rotation direction of said main-mirror holding frame when said vibration control member receives a reaction force from said sub-mirror holding frame in a state where said main mirror is at a midpoint between said retracted position and said viewfinder light-guiding position, wherein said main mirror holding frame includes a gear and said vibration control member includes a gear, said gears being engaged with each other so that a rotational force of said main mirror holding frame is transmitted to said vibration control member by said gears.

11. The movable member drive mechanism of a camera according to claim 10, wherein said gears have a gear ratio such that said vibration control member rotates by a larger amount than a rotation amount of said main mirror holding frame.

12. The movable mirror drive mechanism of a camera according to claim 10, the rotation of said main mirror holding frame being transmitted to said vibration control member without being transmitted through said sub-mirror holding frame.

13. The movable mirror drive mechanism of a camera according to claim 10, a driving connection between said vibration control member and said main mirror holding frame being configured such that said vibration control member rotates by a larger amount than a rotation amount of said main mirror holding frame.

14. The movable mirror drive mechanism of a camera according to claim 10, said main mirror holding frame being configured to transmit rotation to said sub mirror holding frame by a first transmission mechanism, said main mirror holding frame being configured to transmit rotation to said vibration control member by a second transmission mechanism, the first transmission mechanism being distinct from the second transmission mechanism.

15. A movable-mirror drive mechanism of a camera comprising a main mirror which is supported by a main-mirror holding frame and is driven to rotate between a viewfinder light-guiding position, in which said main mirror is positioned in a photographing optical path to reflect incident light, emanating from an object, toward a viewfinder optical system of said camera, and a retracted position, in which said main mirror is retracted from said photographing optical path to allow said object-emanating light to travel toward a photographic light-receiving medium;

a sub-mirror which is supported by a sub-mirror holding frame that is supported by said main-mirror holding frame to be rotatable relative to said main-mirror holding frame, wherein said sub-mirror holding frame is positioned in a projecting position and said sub-mirror reflects part of said incident light emanating from said object in a direction different from a direction toward said viewfinder optical system when said main mirror is in said viewfinder light-guiding position, and wherein said sub-mirror holding frame is positioned in a sub-mirror retracted position and said sub-mirror is retracted with said main mirror from said photographing optical path when said main mirror is in said retracted position; and a vibration control member which rotates in direct response to rotation of said main-mirror holding frame, and holds said sub-mirror holding frame in said projecting position to prevent said sub-mirror holding frame from rotating toward said sub-mirror retracted position at least when said main mirror rotates to said viewfinder light-guiding position, the rotation of said main mirror holding frame being transmitted to said vibration control member without being transmitted through said sub-mirror holding frame.

* * * * *